(12) United States Patent
Hikichi et al.

(10) Patent No.: US 9,344,352 B2
(45) Date of Patent: May 17, 2016

(54) TRANSFER DEVICE, COMMUNICATION SYSTEM, AND ROUNDABOUT PATH DETECTING METHOD

(71) Applicant: FUJITSU LIMITED, Kawasaki-shi, Kanagawa (JP)

(72) Inventors: Kenji Hikichi, Kawasaki (JP); Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 14/075,307

(22) Filed: Nov. 8, 2013

(65) Prior Publication Data
US 2014/0192810 A1    Jul. 10, 2014

(30) Foreign Application Priority Data

Jan. 10, 2013    (JP) .................................. 2013-002961

(51) Int. Cl.
*H04L 12/741*    (2013.01)
*H04L 12/733*    (2013.01)

(52) U.S. Cl.
CPC ............... *H04L 45/126* (2013.01); *H04L 45/54* (2013.01)

(58) Field of Classification Search
CPC .............................. H04L 45/54; H04L 45/126
See application file for complete search history.

(56) References Cited

U.S. PATENT DOCUMENTS

2011/0182298 A1*    7/2011    Shimizu et al. .............. 370/401
2013/0339545 A1*    12/2013    Shenoi et al. ................ 709/240

FOREIGN PATENT DOCUMENTS

JP    2010-98555    4/2010

OTHER PUBLICATIONS

"Cisco Locator/ID Separation Protocol (LISP)," Cisco Systems, Inc., 2011.

* cited by examiner

*Primary Examiner* — Jianye Wu
(74) *Attorney, Agent, or Firm* — Staas & Halsey LLP

(57) ABSTRACT

A transfer device that is installed in a unit network that includes a gateway includes a sending/receiving unit that sends/receives a frame to/from a transfer device that is installed in another unit network in a network that includes the unit network, a determining unit that determines, based on destination address or source address in a packet in the frame sent/received by the sending/receiving unit, whether the packet is related to communication between an internal device that is installed in the network and an external device that is installed outside the network, and a notifying unit that notifies, when the determining unit determines that the packet is related to the communication between the internal device and the external device, the external device of an instruction to switch a gateway.

20 Claims, 33 Drawing Sheets

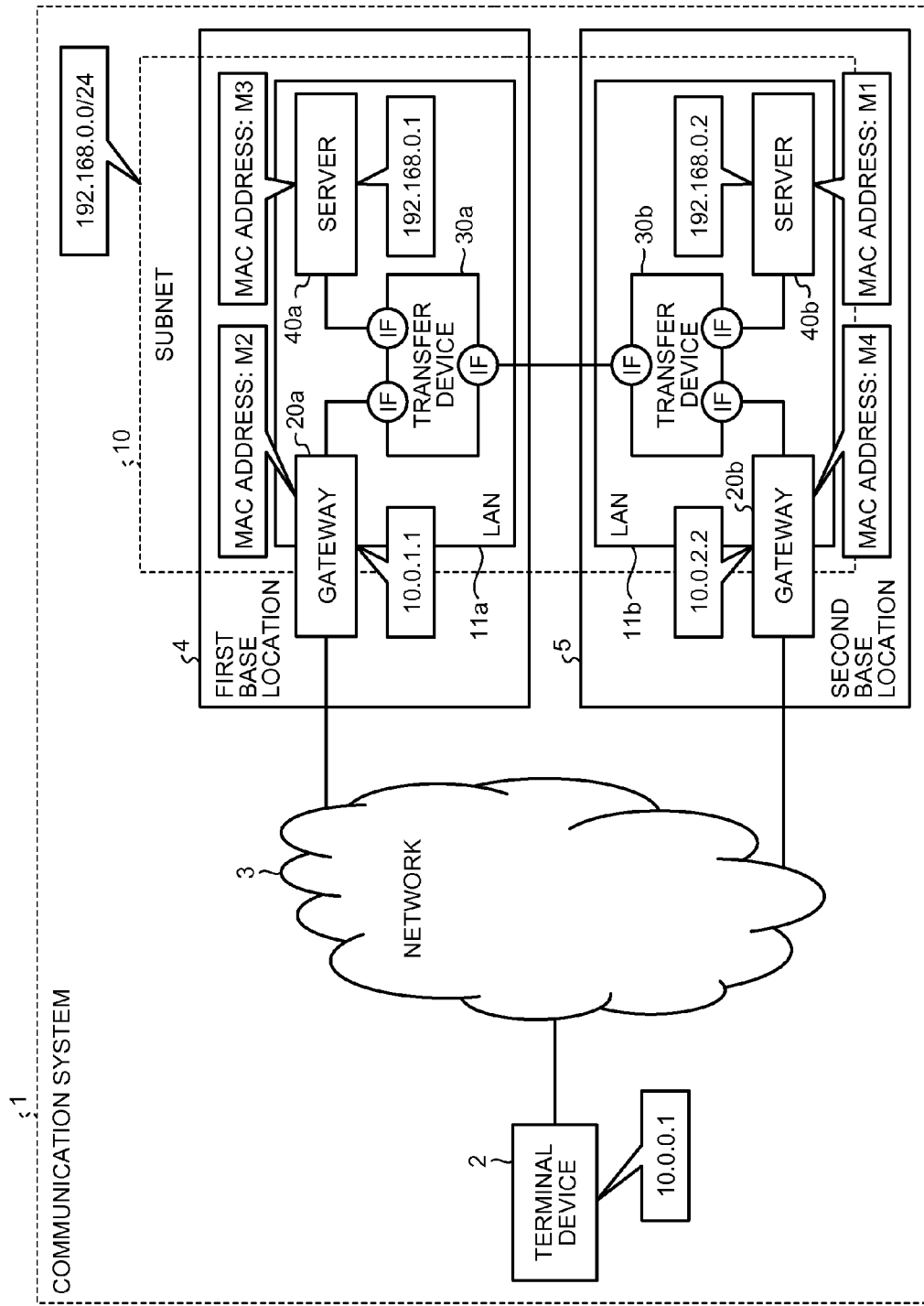

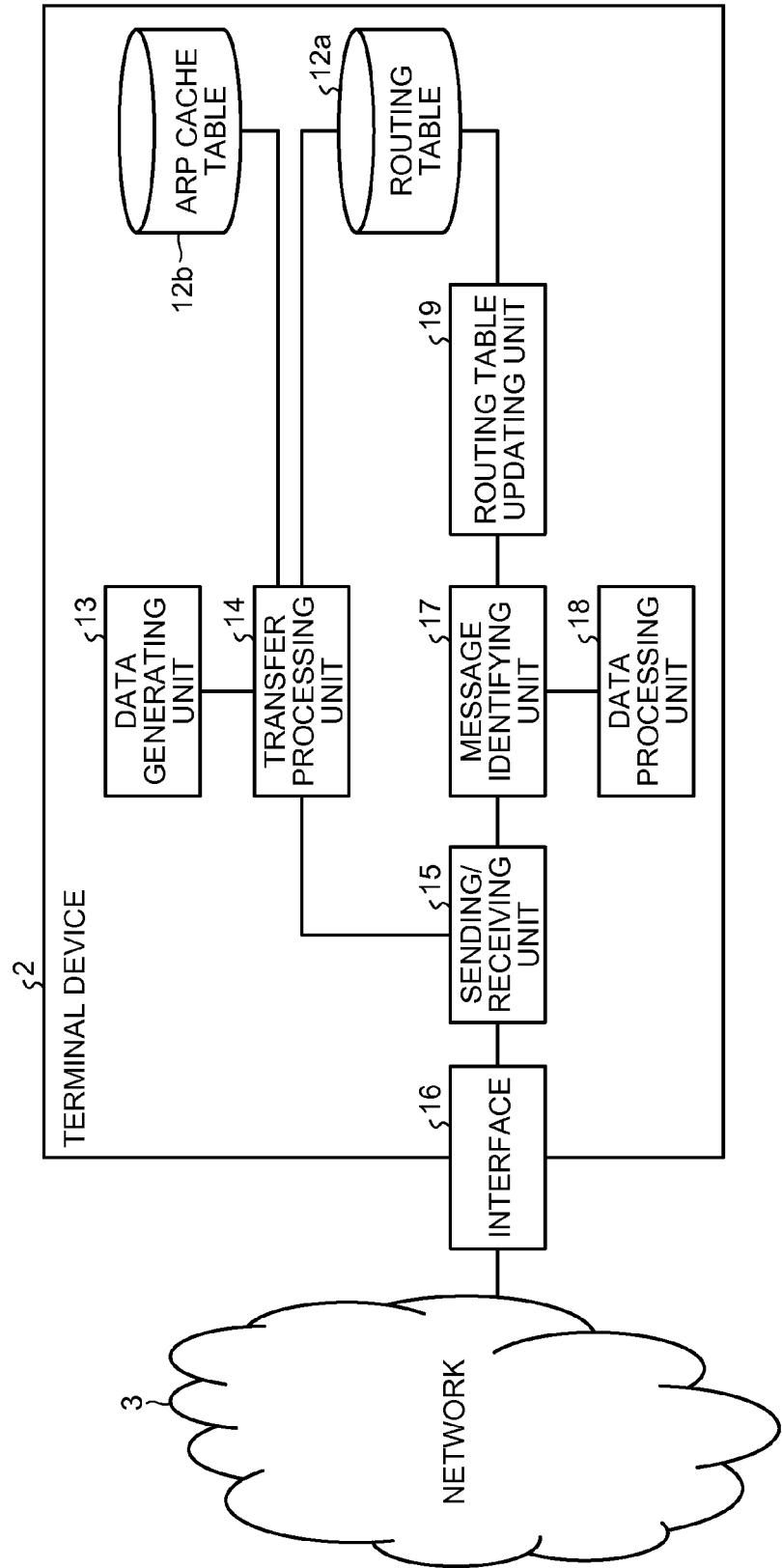

FIG.4A

| DESTINATION IP ADDRESS | IP ADDRESS OF GATEWAY | COMMUNICATION COST |
|---|---|---|
| 192.168.0.0/24 | 10.0.2.2 | 20 |
| 192.168.0.0/24 | 10.0.1.1 | 10 |

FIG.4B

| DESTINATION IP ADDRESS | DESTINATION MAC ADDRESS |
|---|---|
| 10.0.1.1 | M11 |
| 10.0.2.2 | M12 |

FIG.5

| FIELD NAME | SOURCE IP ADDRESS | DESTINATION IP ADDRESS | PAYLOAD |
|---|---|---|---|
| VALUE | 10.0.0.1 | 192.168.0.2 | DATA |

FIG.6

| FIELD NAME | SOURCE IP ADDRESS | DESTINATION IP ADDRESS | ROUNDABOUT FLAG |
|---|---|---|---|
| VALUE | 10.0.0.1 | 192.168.0.2 | ON |

FIG.7

| DESTINATION IP ADDRESS | IP ADDRESS OF GATEWAY | COMMUNICATION COST |
|---|---|---|
| 192.168.0.0/24 | 10.0.2.2 | 20 |
| 192.168.0.0/24 | 10.0.1.1 | 10 |
| 192.168.0.2/32 | 10.0.2.2 | 20 |

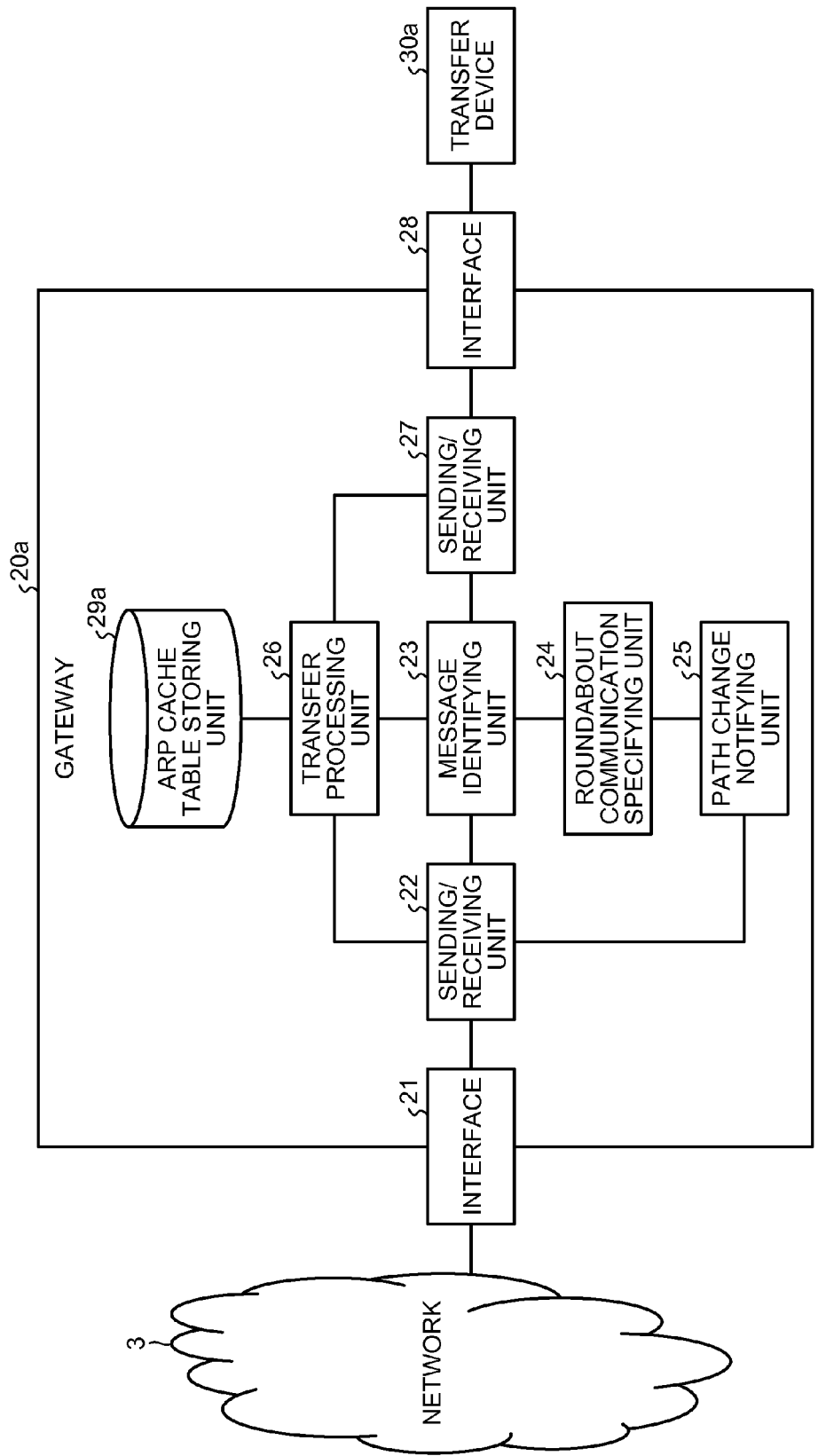

FIG.9A

| IP ADDRESS | MAC ADDRESS |
|---|---|
| 192.168.0.1 | M3 |

| FIELD NAME | DESTINATION MAC ADDRESS | SOURCE IP ADDRESS | DESTINATION IP ADDRESS | PAYLOAD |
|---|---|---|---|---|
| VALUE | M3 | 10.0.0.1 | 192.168.0.1 | DATA |

FIG.10A

| FIELD NAME | SOURCE MAC ADDRESS | DESTINATION MAC ADDRESS | TARGET ADDRESS | PAYLOAD |
|---|---|---|---|---|
| VALUE | M2 | ff:ff:ff:ff:ff:ff (BROADCAST ADDRESS) | 192.168.0.2 | |

FIG.10B

| FIELD NAME | SOURCE MAC ADDRESS | DESTINATION MAC ADDRESS | SOURCE PROTOCOL ADDRESS | PAYLOAD |
|---|---|---|---|---|
| VALUE | M1 | M2 | 192.168.0.2 | |

FIG.12

| INTERFACE IDENTIFIER | LAN COMMUNICATION INFORMATION |
|---|---|
| IF#1 | NO |
| IF#2 | YES |
| IF#3 | NO |

| MAC ADDRESS | OUTPUT INTERFACE |
|---|---|
| M1 | IF#2 |
| M2 | IF#3 |
| M3 | IF#1 |
| M4 | IF#2 |

| INTERFACE IDENTIFIER | LAN COMMUNICATION INFORMATION | IP ADDRESS OF GATEWAY IN LAN AT CONNECTION DESTINATION |
|---|---|---|
| IF#1 | NO | - |
| IF#2 | YES | 10.0.2.2 |
| IF#3 | NO | - |

FIG.17

| FIELD NAME | SOURCE IP ADDRESS | DESTINATION IP ADDRESS | IP ADDRESS OF GATEWAY | ROUNDABOUT FLAG |
|---|---|---|---|---|
| VALUE | 10.0.0.1 | 192.168.0.2 | 10.0.2.2 | ON |

FIG.18

| DESTINATION IP ADDRESS | IP ADDRESS OF GATEWAY | COMMUNICATION COST |
|---|---|---|
| 192.168.0.0/24 | 10.0.2.2 | 20 |
| 192.168.0.0/24 | 10.0.1.1 | 10 |
| 192.168.0.2/32 | 10.0.2.2 | 5 |

FIG.19

| INTERFACE IDENTIFIER | LAN COMMUNICATION INFORMATION | IP ADDRESS OF GATEWAY IN LAN AT CONNECTION DESTINATION | FAILURE FLAG |
|---|---|---|---|
| IF#1 | NO | - | - |
| IF#2 | YES | 10.0.2.2 | ON |
| IF#3 | NO | - | - |

FIG.24

| SOURCE IP ADDRESS | DESTINATION IP ADDRESS |
|---|---|
| 10.0.01 | 192.168.0.2 |

| FIELD NAME | DESTINATION IP ADDRESS | ROUNDABOUT FLAG |
|---|---|---|
| VALUE | 192.168.0.2 | ON |

FIG.27

| TARGET PACKET | DETECTION RULE | COMMUNICATION DIRECTION | COMMUNICATION CONTENT |
|---|---|---|---|
| ARP RESPONSE | DESTINATION MAC ADDRESS =M2 | RECEIVING | LAN COMMUNICATION INFORMATION =YES |

FIG.30

| DESTINATION IP ADDRESS | MAC ADDRESS | ROUNDABOUT FLAG |
|---|---|---|
| 192.168.0.2 | M1 | OFF |

| INTERFACE IDENTIFIER | LAN COMMUNICATION INFORMATION | GATEWAY INFORMATION ON LAN AT CONNECTION DESTINATION |
|---|---|---|
| IF#1 | NO | |
| IF#2 | YES | PRESENT |
| IF#3 | NO | |
| IF#4 | YES | NOT PRESENT |

| INTERFACE IDENTIFIER | LAN COMMUNICATION INFORMATION | GATEWAY IP ADDRESS OF LAN AT CONNECTION DESTINATION |
|---|---|---|
| IF#4 | NO | - |
| IF#5 | YES | 10.0.1.1 |
| IF#6 | NO | - |

FIG.36

| TARGET PACKET | DETECTION RULE | COMMUNICATION DIRECTION | COMMUNICATION CONTENT |
|---|---|---|---|
| IP PACKET | SOURCE IP ADDRESS ≠192.168.0.0/24 | RECEIVING | LAN COMMUNICATION INFORMATION=YES |

| TARGET PACKET | DETECTION RULE | COMMUNICATION DIRECTION | COMMUNICATION CONTENT |
|---|---|---|---|
| ARP RESPONSE | DESTINATION MAC ADDRESS =MAC ADDRESS LIST | SENDING | LAN COMMUNICATION INFORMATION=YES |

33b

TRANSFER DEVICE, COMMUNICATION SYSTEM, AND ROUNDABOUT PATH DETECTING METHOD

CROSS-REFERENCE TO RELATED APPLICATION

This application is based upon and claims the benefit of priority of the prior Japanese Patent Application No. 2013-002961, filed on Jan. 10, 2013, the entire contents of which are incorporated herein by reference.

FIELD

The embodiments discussed herein are related to a transfer device, a communication system, and a roundabout path detecting method.

BACKGROUND

There is a known technology that communicates with terminal devices via a network to provide services. A known example of this technology is a communication system in which information processing apparatuses that provide services are arranged in multiple base locations and the services are provided by allowing the information processing apparatuses in the base locations to cooperate with each other.

For example, the communication system has a subnet in which local area networks (LANs) in base locations each having a gateway are connected by switches. Then, an information processing apparatus in each of the base locations performs packet communication, via the corresponding gateway by using an Internet Protocol (IP), with a terminal device arranged outside the subnet and provides various services to the terminal device.

Here, a single network address is allocated to the entirety of the subnet. Furthermore, the subnet notifies the terminal device of the address of each gateway in each LAN as the gateway that is used for accessing the subnet. When a terminal device accesses the subnet, the terminal device selects a single address from among the addresses of the gateways that are received as a notification and then sends a packet to a destination that is the selected address.

However, although the subnet notifies the terminal device of the addresses of the gateways that are used for accessing the subnet, the subnet does not notify the terminal device of information indicating which information processing apparatus is installed in which LAN. Consequently, there may be a case in which the terminal device sends a packet to a gateway in a LAN that is different from the LAN in which the information processing apparatus that corresponds to the destination of the packet is located.

At this point, when a packet is sent to a gateway in a LAN that is different from the LAN in which the information processing apparatus that corresponds to the destination of the packet is located, the switch in the subnet transfers the packet to the LAN in which the information processing apparatus that corresponds to the destination of the packet is located. Consequently, packet communication is performed following a roundabout communication path without passing through the gateway in the LAN in which the information processing apparatus that corresponds to the destination of the packet is located.

In order to prevent such packet communication being performed via a roundabout communication path, there is a known technology in which a management server that manages the gateways in the LANs in which information processing apparatuses are installed notifies the gateway of the LAN in which the information processing apparatus that is the destination of a packet is installed. For example, the management server stores therein, in an associated manner, address of gateways and addresses of the information processing apparatuses that are installed in their corresponding LANs. When the management server receives a query about a gateway and an address of an information processing apparatus, the management server notifies the query source of the address of the gateway that is stored in the management server and that is associated with the received address of the information processing apparatus, whereby packet communication that is performed via a roundabout communication path is prevented.

Patent Document 1: Japanese Laid-open Patent Publication No. 2010-098555

Non-Patent Document 1: "VM Mobility Cisco Locator/ID Separation Protocol", URL: www.cisco.com/web/JP/product/hs/ios/iprs/ipr/prodlit/pdf/at_a_glance_c45-646350.pdf (The "http://" is omitted), Last access on Dec. 7, 2012

However, with the technology described above in which the management server prevents packet communication from being performed via a roundabout communication path, there is a problem in that the processing cost of managing all the addresses of information processing apparatuses and all the addresses of the gateways included in a subnet increase.

SUMMARY

According to an aspect of an embodiment, a transfer device that is installed in a unit network that includes a gateway includes a sending/receiving unit that sends/receives a frame to/from a transfer device that is installed in another unit network in a network that includes the unit network, a determining unit that determines, based on destination address or source address in a packet in the frame sent/received by the sending/receiving unit, whether the packet is related to communication between an internal device that is installed in the network and an external device that is installed outside the network, and a notifying unit that notifies, when the determining unit determines that the packet is related to the communication between the internal device and the external device, the external device of an instruction to switch a gateway.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an example of IP addresses and network addresses that are set in each device according to the first embodiment;

FIG. 3 is a schematic diagram illustrating an example of the functional configuration of a terminal device;

FIG. 4A is a schematic diagram illustrating an example of a routing table;

FIG. 4B is a schematic diagram illustrating an example of an ARP cache table in the terminal device;

FIG. 5 is a schematic diagram illustrating an example of the format of an IP packet;

FIG. 6 is a schematic diagram illustrating an example of the format of a roundabout notification message;

FIG. 7 is a schematic diagram illustrating an example of the routing table after it has been updated;

FIG. 8 is a schematic diagram illustrating an example of the functional configuration of a gateway on the subnet side;

FIG. 9A is a schematic diagram illustrating an example of an ARP cache table stored in a gateway;

FIG. 9B is a schematic diagram illustrating an example of the format of an Ethernet frame;

FIG. 10A is a schematic diagram illustrating an example of the format of an ARP request;

FIG. 10B is a schematic diagram illustrating an example of the format of an ARP response;

FIG. 12 is a schematic diagram illustrating an example of interface information;

FIG. 13 is a schematic diagram illustrating an example of a MAC learning table included in the transfer device;

FIG. 16 is a schematic diagram illustrating a first variation of the interface information;

FIG. 17 is a schematic diagram illustrating a variation of the format of the roundabout notification message;

FIG. 18 is a schematic diagram illustrating a variation of the updated routing table;

FIG. 19 is a schematic diagram illustrating a second variation of the interface information;

FIG. 24 is a schematic diagram illustrating an example of an address association table stored in the gateway according to the third embodiment;

FIG. 25 is a schematic diagram illustrating an example of the format of a roundabout notification message according to the third embodiment;

FIG. 27 is a schematic diagram illustrating an example of roundabout packet identification information stored in the transfer device according to the third embodiment;

FIG. 30 is a schematic diagram illustrating a variation of the ARP cache table stored in the gateway;

FIG. 33 is a schematic diagram illustrating an example of interface information according to the fifth embodiment;

FIG. 35 is a schematic diagram illustrating a variation of interface information according to a sixth embodiment;

FIG. 36 is a schematic diagram illustrating a variation of roundabout packet identification information according to the sixth embodiment;

DESCRIPTION OF EMBODIMENTS

Preferred embodiments of the present invention will be explained with reference to accompanying drawings.

Furthermore, the embodiments may be appropriately used in combination as long as they do not conflict with each other.

[a] First Embodiment

Figure 1:
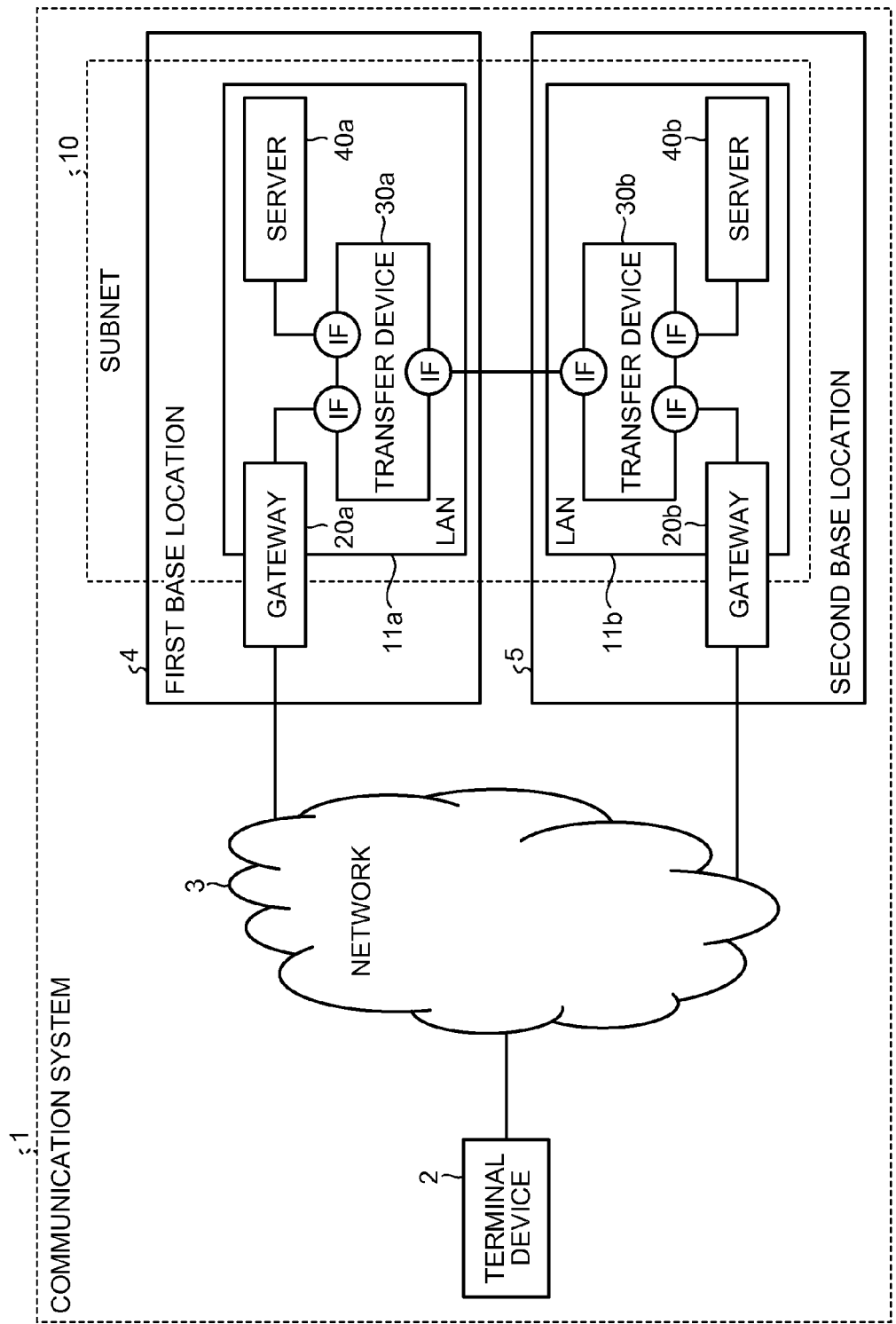
FIG. 1 is a schematic diagram illustrating a communication system according to a first embodiment.

In a first embodiment, an example of a communication system will be described with reference to FIG. 1. FIG. 1 is a schematic diagram illustrating a communication system according to a first embodiment. In the example illustrated in FIG. 1, a communication system 1 includes a terminal device 2, a network 3, a first base location 4, and a second base location 5. The first base location 4 includes a local area network (LAN) 11a. The second base location 5 includes a LAN 11b. The first base location 4 and the second base location 5 are, for example, data centers, each of which is located in a different region.

The LAN 11a includes a gateway 20a, a transfer device 30a, and a server 40a. The LAN 11b includes a gateway 20b, a transfer device 30b, and a server 40b. The LAN 11a and the LAN 11b are connected via the transfer device 30a and the transfer device 30b and operate as a subnet 10. A single network address is allocated to the entirety of the subnet 10.

Here, the transfer device 30a includes multiple interfaces (IFs) and is connected to the gateway 20a, the server 40a, and the transfer device 30b via the corresponding interfaces. Furthermore, similarly to the transfer device 30a, the transfer device 30b includes multiple interfaces and is connected to the gateway 20b, the server 40b, and the transfer device 30a via the corresponding interfaces.

For ease of understanding, FIG. 1 illustrates the subnet 10, in which two base locations cooperate with each other; however, the embodiment is not limited thereto. For example, LANs installed in three or more base locations may also be connected with each other as the subnet 10. Furthermore, in the example illustrated in FIG. 1, each of the LANs 11a and 11b has a single server; however, the embodiment is not limited thereto. For example, each of the LANs 11a and 11b may also have two or more servers.

Here, an IP address and a network address used for packet communication are allocated to each of the terminal device 2, the gateways 20a and 20b, the subnet 10, and the servers 40a and 40b. In the following, an example of an IP address that is allocated to each of the terminal device 2, and the gateways 20a and 20b and a network address that is allocated to each of the subnet 10 and the servers 40a and 40b will be described with reference to FIG. 2.

FIG. 2 is a schematic diagram illustrating an example of IP addresses and network addresses that are set in each device according to the first embodiment. In the example illustrated in FIG. 2, the IP address "10.0.0.1" is allocated to the terminal device 2, the IP address "10.0.1.1" is allocated to the gateway 20a, and the IP address "10.0.2.2" is allocated to the gateway 20b. Consequently, "10.0.1.1" and "10.0.2.2" are sent, to the terminal device 2, as notifications indicating the addresses of the gateways used for accessing the subnet 10.

Furthermore, a network address and the mask value "192.168.0.0/24" are allocated to the subnet 10. Furthermore, the network address "192.168.0.1" used in the subnet 10 is allocated to the server 40a and the network address "192.168.0.2" used in the subnet 10 is allocated to the server 40b.

Furthermore, a media access control (MAC) address "M1" is allocated to the server 40b and a MAC address "M2" is allocated to the interface on the subnet 10 side of the gateway 20a. Furthermore, a MAC address "M3" is allocated to the server 40a and a MAC address "M4" is allocated to the interface on the subnet 10 side of the gateway 20b.

In the following, descriptions will be given of the functions performed by the terminal device 2, the network 3, the gateway 20a, the transfer device 30a, and the server 40a in the communication system 1. It is assumed that the gateway 20b has the same function as that performed by the gateway 20a, the transfer device 30b has the same function as that performed by the transfer device 30a, and the server 40b has the same function as that performed by the server 40a; therefore, descriptions thereof will be omitted.

The terminal device 2 is a terminal device that receives various services from the subnet 10 and is an information processing apparatus, such as a personal computer (PC), personal digital assistant (PDA), or user equipment. Specifically, the terminal device 2 receives, as notifications, IP addresses of the gateways 20a and 20b included in the subnet 10. Consequently, the terminal device 2 selects one of the gateway 20a and the gateway 20b as a priority gateway. If the terminal device 2 performs packet communication with one of the servers 40a and 40b in the subnet 10, the terminal device 2 sends, via the network 3, an IP packet to the destination that is selected as the priority gateway.

For example, the terminal device 2 stores therein a routing table in which the network address of the subnet 10, the IP address of the gateway 20a, and the IP address of the gateway 20b are stored in an associated manner. When the terminal device 2 sends an IP packet to the server 40a, the terminal device 2 generates an IP packet in which the destination IP address "192.168.0.1" is stored in the IP header. Furthermore, the terminal device 2 determines that the destination IP address "192.168.0.1" is included in the network address of the subnet 10 and identifies the gateways 20a and 20b in the subnet 10.

When the terminal device 2 selects the gateway 20a as a priority gateway, the terminal device 2 acquires the MAC address of the gateway 20a by using the IP address "10.0.1.1" of the gateway 20a. Then, the terminal device 2 generates a frame (Ethernet frame) in which the acquired MAC address is stored as the destination MAC address and then stores the generated IP packet in the generated frame. Thereafter, the terminal device 2 sends the frame in which the IP packet is stored.

The network 3 is a public network, such as the Internet, or a closed network, such as a LAN. For example, the network 3 transfers a packet in accordance with the destination IP address of a packet in a frame that is received from the terminal device 2.

The gateway 20a is connected to the network 3 and interfaces (IFs) of the transfer device 30a and relays communication between the terminal device 2 and each of the servers 40a and 40b that are included in the subnet 10. Specifically, when the gateway 20a receives, via the network 3, a frame that has been sent from the terminal device 2, the gateway 20a extracts an IP packet that is included in the received frame. Then, the gateway 20a transfers the packet in accordance with the destination IP address stored in the extracted IP packet. In the description below, an IP packet in a frame that is received by the gateway 20a may sometimes be described as a packet received by the gateway 20a.

For example, the gateway 20a stores therein an address resolution protocol (ARP) table in which the IP address "192.168.0.1" of the server 40a is associated with the MAC address "M3". Furthermore, when the gateway 20a receives an IP packet in which "192.168.0.1" is stored as the destination IP address, the gateway 20a acquires the MAC address "M3" of the server 40a that is associated with "192.168.0.1" and that is stored in the ARP table. Then, the gateway 20a stores the received IP packet in a frame in which the acquired MAC address "M3" of the server 40a is stored as the destination MAC address and then sends the frame to the transfer device 30a.

In contrast, when the gateway 20a receives an IP packet in which the IP address "192.168.0.2" of the server 40b is stored as the destination IP address, the gateway 20a determines that the associated MAC address is not stored in the ARP table. In such a case, in order to acquire the MAC address of the server 40b, the gateway 20a broadcasts, to the subnet 10, an ARP request in which the IP address "192.168.0.2" is stored as the target address. Specifically, the gateway 20a broadcasts a frame in which an ARP request packet is stored.

In such a case, the ARP request is transferred to the server 40b via the transfer device 30a and the transfer device 30b. Consequently, the server 40b generates an ARP response in which the MAC address "M1" of the server 40b is stored and then sends the generated ARP response to the gateway 20a via the transfer device 30b and the transfer device 30a. In such a case, the gateway 20a stores the IP packet received from the terminal device 2 in the frame in which the MAC address of the server 40b stored in the ARP response is stored as the destination MAC address and then sends the frame to the transfer device 30a.

The transfer device 30a is a transfer device that relays frame communication between the LAN 11a and the LAN 11b and is, for example, an L2 switch. Specifically, the transfer device 30a stores therein a forwarding database (FDB) in which the destination MAC address is associated with the interface to output a frame. When the transfer device 30a receives a frame from the gateway 20a, the server 40a, or the transfer device 30b, the transfer device 30a acquires the destination MAC address of the received frame and then outputs the frame from the interface that is associated with the acquired destination MAC address.

For example, when the transfer device 30a receives, from the server 40a, a packet in which "M1" is stored as the destination MAC address, the transfer device 30a sends the received frame to the transfer device 30b. Then, the transfer device 30b sends, to the server 40b, the frame received from the transfer device 30a.

The server 40a is a server that provides various services to the terminal device 2 by performing packet communication with the terminal device 2 and is an information processing apparatus that executes, for example, a program for providing various services. Furthermore, by communicating with the server 40b, the server 40a exchanges data and cooperates with the server 40b in order to provide various services to the terminal device 2.

The IP addresses of the gateways 20a and 20b are sent to the terminal device 2 as a notification; however, the notification does not include information indicating which server 40a or 40b is included in which LAN 11a or 11b. Consequently, when the terminal device 2 selects the gateway 20a as a priority gateway, the terminal device 2 may possibly send a frame that is destined for the server 40b to the gateway 20a, even though the gateway 20b is installed in the LAN 11b that includes the server 40b.

In such a case, because the packet received by the gateway 20a is transferred to the server 40b via the transfer device 30a and the transfer device 30b, the communication path between the terminal device 2 and the server 40b becomes a detour path, i.e., a roundabout path. The roundabout path mentioned here is a path for packet communication that is performed via a gateway that is different from the gateway installed in the destination LAN of the packet.

Accordingly, in the communication system 1, the transfer device 30a that relays communication between the LAN 11a and the LAN 11b determines whether a communication path is a roundabout path. In the following, a description will be given of a process in which the transfer device 30a determines whether a communication path is a roundabout path.

First, the transfer device 30a stores therein interface information that indicates whether the connection destination of each interface is a LAN that is other than the LAN 11a. When the transfer device 30a receives a frame, the transfer device 30a determines whether the interface that outputs the received frame is connected to a LAN other than the LAN 11a, i.e., connected to the transfer device 30b in the LAN 11b.

Furthermore, if the interface that outputs the frame is connected to the transfer device 30b, the transfer device 30a determines whether the type of packet in the frame to be output is an IP packet that is used for data communication or the like. Here, in the IP packet, the IP address of the device that has sent the IP packet is stored as the source IP address and the IP address of the device that corresponds to the destination of the IP packet is stored as the destination IP address. For example, in the IP packet that was sent by the terminal device 2 to the server 40b, the IP address of the terminal device 2 is stored as the source IP address and the IP address of the server 40b is stored as the destination IP address.

Then, when the type of the packet in the frame to be output is an IP packet, the transfer device 30a determines whether the source IP address stored in the IP packet is within the range of the IP addresses included in the subnet 10. Specifically, the transfer device 30a determines whether the IP packet to be sent is an IP packet that is related to the packet communication between the servers 40a and 40b, which are internal devices in the subnet 10, and the terminal device 2, which is an external device of the subnet 10.

When the transfer device 30a determines that the source IP address in the IP packet is not within the range of the IP addresses included in the subnet 10, the transfer device 30a determines that the packet in the received frame is a roundabout packet that is transferred via a roundabout path. When the transfer device 30a determines that the received packet is a roundabout packet, the transfer device 30a sends, to the terminal device 2 via the gateway 20a, an instruction to switch the gateways.

Specifically, in the example illustrated in FIG. 1, each of the LANs 11a and 11b includes a gateway. Here, when the transfer device 30a transfers, from the LAN 11a to the LAN 11b, an IP packet that is transferred between the server 40b and the terminal device 2, it can be determined that the transferred IP packet is a roundabout packet. Consequently, when the source IP address in the IP packet in the frame to be sent to the transfer device 30b is not the IP address of the subnet 10, e.g., when the source is the terminal device 2, the transfer device 30a determines that the IP packet to be sent is a roundabout packet.

Furthermore, when the transfer device 30a determines that the IP packet in the frame to be sent is a roundabout packet, the transfer device 30a notifies the terminal device 2 of the switching of the gateways. Consequently, the terminal device 2 rewrites the routing table and switches the priority gateway from the gateway 20a to the gateway 20b. Therefore, the transfer device 30a can prevent a communication path from being a roundabout path without managing the LANs in the subnet 10 in which the servers 40a and 40b are installed. Furthermore, by performing the same process as that performed by the transfer device 30a, the transfer device 30b may also determine whether a communication path between the terminal device 2 and the server 40a is a roundabout path.

In the following, a description will be given of an example of each of the functional configurations of the terminal device 2, the gateway 20a, and the transfer device 30a. First, an example of the functional configuration of the terminal device 2 will be described with reference to FIG. 3.

FIG. 3 is a schematic diagram illustrating an example of the functional configuration of a terminal device. In the example illustrated in FIG. 3, the terminal device 2 includes a routing table 12a and an ARP cache table 12b. Furthermore, the terminal device 2 includes a data generating unit 13, a transfer processing unit 14, a sending/receiving unit 15, an interface 16, a message identifying unit 17, a data processing unit 18, and a routing table updating unit 19.

The routing table 12a stores therein IP addresses of gateways that are included in a network for which a packet is destined. For example, FIG. 4A is a schematic diagram illustrating an example of a routing table. As illustrated in FIG. 4A, the routing table 12a stores therein, in an associated manner, the destination IP address, the IP address of a gateway, and the communication cost.

The destination IP address mentioned here means an IP address and a mask value allocated to the network for which a packet is destined. The IP address of a gateway means an IP address allocated to a gateway in the network to which the associated destination IP address is allocated. The communication cost means a value of the communication cost that occurs when packet communication is performed via the gateway indicated by the associated IP address. The value can be calculated from a delay in a network, the bandwidth used in a network line, or the like.

For example, the routing table 12a stores therein, in an associated manner, the network address and the mask value "192.168.0.0/24" of the subnet 10, the IP address "10.0.2.2" of the gateway 20b, and the communication cost "20". Furthermore, the routing table 12a stores therein, in an associated manner, the network address and the mask value "192.168.0.0/24" of the subnet 10, the IP address "10.0.1.1" of the gateway 20a, and the communication cost "10". Consequently, the terminal device 2 selects the gateway 20a with a small communication cost as a priority gateway.

A description will be given here by referring back to FIG. 3. The ARP cache table 12b stores therein, in an associated manner, the destination IP address used when a packet is sent to one of the gateways 20a and 20b and the destination MAC address that is stored in a frame. For example, FIG. 4B is a schematic diagram illustrating an example of an ARP cache table in the terminal device. In the example illustrated in FIG. 4B, the ARP cache table 12b stores therein, in an associated manner, the IP address "10.0.1.1" of the gateway 20a and the MAC address "M11" of the network 3 side of the gateway 20a. Furthermore, the ARP cache table 12b stores therein, in an associated manner, the IP address "10.0.2.2" of the gateway 20b and the MAC address "M12" of the network 3 side of the gateway 20b.

A description will be given here by referring back to FIG. 3. The data generating unit 13 generates data to be sent to the servers 40a and 40b that are included in the subnet 10 and outputs, to the transfer processing unit 14, the generated data and the IP address that indicates the destination. For example, when the data generating unit 13 generates data to be sent to the server 40b, the data generating unit 13 outputs the data and the IP address "192.168.0.2" of the server 40b to the transfer processing unit 14.

When the transfer processing unit 14 receives the data and the IP address that indicates the destination of the data from the data generating unit 13, the transfer processing unit 14 checks the received IP address against the routing table 12a and acquires the IP address of a gateway that is included in the network to which a packet is destined. Specifically, from among the destination IP addresses that include the IP address that indicates the destination of the data, the transfer processing unit 14 selects an entry with the largest network mask value.

Here, when the transfer processing unit 14 selects multiple entries, the transfer processing unit 14 selects, from among the selected entries, an entry with the smallest value of the communication cost. Then, the transfer processing unit 14 acquires the IP address of the gateway that is stored in the selected entry. For example, when the routing table 12a stores therein information illustrated in FIG. 4A, because the mask values of the entries are the same, the transfer processing unit 14 acquires the IP address "10.0.1.1" of the gateway 20a with the lowest communication cost.

Then, the transfer processing unit 14 sends an IP packet by using the acquired IP address of the gateway. Specifically, the transfer processing unit 14 generates an IP packet in which the IP address "192.168.0.2" received from the data generating unit 13 is stored as the destination IP address and the data received from the data generating unit 13 is stored in the payload. Furthermore, the transfer processing unit 14 generates, from the ARP cache table 12b, a frame in which the MAC address "M11" associated with the IP address "10.0.1.1" of the gateway 20a is stored as the destination MAC address. Then, the transfer processing unit 14 stores the generated IP packet in the generated frame and outputs the frame to the sending/receiving unit 15.

FIG. 5 is a schematic diagram illustrating an example of the format of an IP packet. FIG. 5 illustrates an example of a field name of an IP packet and values that are stored in each field. For example, the transfer processing unit 14 generates an IP packet in which the IP address "10.0.0.1" of the terminal device 2 is stored as the source IP address and the IP address "192.168.0.2" of the server 40b is stored as the destination IP address in the header portion.

Then, the transfer processing unit 14 stores, in the payload in the generated IP packet, the data received from the data generating unit 13. Furthermore, the transfer processing unit 14 attaches, to the IP packet illustrated in FIG. 5, an Ethernet header in which the MAC address "M11" of the interface on the network 3 side of the gateway 20a is stored as the destination MAC address, and thereby the transfer processing unit 14 stores the IP packet in the frame. Then, the transfer processing unit 14 outputs the frame in which the IP packet is stored to the sending/receiving unit 15.

A description will be given here by referring back to FIG. 3. The sending/receiving unit 15 sends and receives a frame via the interface 16. For example, when the sending/receiving unit 15 receives a frame from the transfer processing unit 14, the sending/receiving unit 15 sends the frame to the network 3 via the interface 16. Furthermore, when the sending/receiving unit 15 receives a frame via the interface 16, the sending/receiving unit 15 outputs the received frame to the message identifying unit 17. The interface 16 is an interface that sends/receives a frame in which a packet is stored. The interface 16 is, for example, a communication port included in the terminal device 2.

When the packet in the frame received from the sending/receiving unit 15 is a roundabout notification message, the message identifying unit 17 outputs the received roundabout notification message to the routing table updating unit 19. Furthermore, when the packet in the received frame is an IP packet related to packet communication, the message identifying unit 17 extracts the packet from the frame and outputs the extracted packet to the data processing unit 18.

When the data processing unit 18 receives the IP packet from the message identifying unit 17, the data processing unit 18 acquires data that is stored in the payload in the received IP packet and then executes various processes by using the acquired data. Furthermore, when the routing table updating unit 19 receives a roundabout notification message from the message identifying unit 17, the routing table updating unit 19 updates the routing table 12a on the basis of the received roundabout notification message and then switches the gateways.

For example, FIG. 6 is a schematic diagram illustrating an example of the format of a roundabout notification message. As illustrated in FIG. 6, the data processing unit 18 receives, as a roundabout notification message, a packet in which the source IP address, the destination IP address, and the roundabout flag are stored. Here, the source IP address and the destination IP address illustrated in FIG. 6 are not IP addresses that indicate the source and the destination of the roundabout notification message, respectively, but are IP addresses that indicate the source and the destination of the IP packet transferred via a roundabout path, respectively. Furthermore, the roundabout flag means information indicating whether an IP packet in which the IP address stored as the destination IP address is stored as the destination is a roundabout packet.

For example, in the example illustrated in FIG. 6, the routing table updating unit 19 receives a roundabout notification message that includes the source IP address "10.0.0.1", the destination IP address "192.168.0.2", and the roundabout flag "ON". In such a case, the routing table updating unit 19 switches the gateway used when a packet in which "192.168.0.2" is stored as the destination IP address is sent.

FIG. 7 is a schematic diagram illustrating an example of the routing table after it has been updated. As illustrated in FIG. 7, the routing table updating unit 19 adds, to the destination IP address, an entry in which the destination IP address "192.168.0.2" for the roundabout notification message is stored. Furthermore, the routing table updating unit 19 sets a mask value, for example, "/32", that is greater than the other entries.

Furthermore, the routing table updating unit 19 stores, in the added entry, the IP address "10.0.2.2" of the gateway 20b that is not the priority gateway. Furthermore, the routing table updating unit 19 stores, in the added entry, the communication cost "20" that was associated with the IP address "10.0.2.2" of the gateway 20b before the entry was added. Consequently, because the transfer processing unit 14 selects an entry in which the mask value of the destination IP address is the largest, the transfer processing unit 14 selects the gateway 20b as the priority gateway when the transfer processing unit 14 sends a packet destined for the server 40b.

In the following, the functional configuration of the gateway 20a will be described with reference to FIG. 8. FIG. 8 is a schematic diagram illustrating an example of the functional configuration of a gateway on the subnet side. In the example illustrated in FIG. 8, the gateway 20a includes interfaces 21 and 28, sending/receiving units 22 and 27, a message identifying unit 23, a roundabout communication specifying unit 24, a path change notifying unit 25, a transfer processing unit 26, and an ARP cache table storing unit 29a. Furthermore, the interface 21 is an interface on the network 3 side. The MAC address "M11" is allocated to the interface 21. The interface 28 is an interface on the subnet 10 side. The MAC address M2 is allocated to the interface 28.

The ARP cache table storing unit 29a stores therein, in an associated manner, an IP address and a MAC address. For example, FIG. 9A is a schematic diagram illustrating an example of an ARP cache table stored in a gateway. In the example illustrated in FIG. 9A, the ARP cache table storing unit 29a stores therein an ARP cache table in which the IP address "192.168.0.1" is associated with the MAC address "M3". Specifically, the ARP cache table storing unit 29a stores therein, in an associated manner, the IP address and the MAC address of the server 40a.

A description will be given here by referring back to FIG. 8. When the sending/receiving unit 22 receives a frame from the network 3 via the interface 21, the sending/receiving unit 22 outputs the received frame to the message identifying unit 23. Furthermore, when the sending/receiving unit 22 receives a roundabout notification message from the path change notifying unit 25, the sending/receiving unit 22 outputs the received roundabout notification message to the network 3. Furthermore, when the sending/receiving unit 22 receives a frame from the transfer processing unit 26, the sending/receiving unit 22 outputs the frame to the network 3 via the interface 21.

When the message identifying unit 23 receives the frame from the sending/receiving unit 22, the message identifying unit 23 outputs the received frame to the transfer processing unit 26. Furthermore, when the message identifying unit 23 receives a frame from the sending/receiving unit 27, the message identifying unit 23 determines whether the packet in the received frame is an IP packet, a packet of a roundabout notification message, or a packet of an ARP response. When the packet in the received frame is an IP packet or a packet of the ARP response, the message identifying unit 23 outputs the packet to the transfer processing unit 26. In contrast, when the packet in the received frame is a packet of the roundabout notification message, the message identifying unit 23 outputs the received roundabout notification message to the roundabout communication specifying unit 24.

When the roundabout communication specifying unit 24 receives the roundabout notification message from the message identifying unit 23, the roundabout communication specifying unit 24 specifies, by using the source IP address of the received roundabout notification message, an external device that performs packet communication via a roundabout path. Then, the roundabout communication specifying unit 24 notifies the path change notifying unit 25 of the roundabout notification message and the specified external device.

When the path change notifying unit 25 receives, from the roundabout communication specifying unit 24, the roundabout notification message and the external device that is specified by the roundabout communication specifying unit 24, the path change notifying unit 25 generates a packet in which the external device specified by the roundabout communication specifying unit 24 is stored as the destination and then stores the roundabout notification message in the generated packet. Then, the path change notifying unit 25 stores the roundabout notification message in a frame in which the MAC address of the external device specified by the roundabout communication specifying unit 24 is stored as the destination MAC address and then outputs the frame to the sending/receiving unit 22.

The transfer processing unit 26 executes a packet transfer process on the gateway 20a. For example, when the transfer processing unit 26 receives a frame from the message identifying unit 23, the transfer processing unit 26 identifies the destination IP address in the IP packet in the received frame. When the identified destination IP address is not included in the network address "192.168.0.0/24" in the subnet 10, the transfer processing unit 26 acquires a MAC address that is associated with the destination IP address. Then, the transfer processing unit 26 stores the IP packet in the frame in which the acquired MAC address is stored as the destination MAC address and then outputs the frame to the sending/receiving unit 22.

Furthermore, when the identified destination IP address is included in the network address "192.168.0.0/24" in the subnet 10, the transfer processing unit 26 determines whether the identified destination IP address is stored in the ARP cache table storing unit 29a. Furthermore, when the identified destination IP address is stored in the ARP cache table storing unit 29a, the transfer processing unit 26 acquires the MAC address that is associated with the identified destination IP address. In contrast, when the identified destination IP address is not stored in the ARP cache table storing unit 29a, the transfer processing unit 26 issues an ARP request and acquires the MAC address of the device indicated by the destination IP address. Then, the transfer processing unit 26 stores the IP packet received from the message identifying unit 23 in the frame in which the acquired MAC address is stored as the destination MAC address. Then, the transfer processing unit 26 outputs the frame to the sending/receiving unit 27.

In the following, an example of the format of the frame transferred in the subnet 10 will be described with reference to FIG. 9B. FIG. 9B is a schematic diagram illustrating an example of the format of an Ethernet frame. As illustrated in FIG. 9B, the Ethernet frame includes a destination MAC address, a source IP address, a destination IP address, and a payload. Specifically, the Ethernet frame has a format in which a destination MAC address is attached to an IP packet.

For example, when the transfer processing unit 26 receives an IP packet in which "192.168.0.1" is stored as the destination IP address, the transfer processing unit 26 acquires the MAC address "M3" that is associated with "192.168.0.1" from the ARP cache table storing unit 29a. Then, the transfer processing unit 26 stores the IP address "10.0.0.1" of the gateway 20a in the source IP address, stores the IP packet in a frame in which "M3" is stored as the destination MAC address, and then outputs the frame to the sending/receiving unit 27.

In contrast, when the destination IP address is not stored in the ARP cache table storing unit 29a, the transfer processing unit 26 issues an ARP request. In the following, a process in which the transfer processing unit 26 acquires, by using an ARP request, the MAC address of the device that is indicated by the destination IP address will be specifically described with reference to FIGS. 10A and 10B. First, a process in which the transfer processing unit 26 issues an ARP request will be described with reference to FIG. 10A.

FIG. 10A is a schematic diagram illustrating an example of the format of an ARP request. As illustrated in FIG. 10A, the transfer processing unit 26 generates an ARP request in which the source MAC address, the destination MAC address, the target address, and the payload are stored. The source MAC address mentioned here means the MAC address of the source of an ARP request and the destination MAC address means the MAC address of the destination of the ARP request. Furthermore, the target address means the IP address that indicates the device that requests a MAC address notification.

Because the transfer processing unit 26 broadcasts an ARP request, the transfer processing unit 26 stores "ff:ff:ff:ff:ff:ff", which is the broadcast address, in the destination MAC address. The information of various kinds on the ARP request illustrated in FIG. 10A is information stored in a packet for an ARP request and is information that is different from the information used for a transfer.

For example, the transfer processing unit 26 receives a frame that stores therein an IP packet in which the IP address "192.168.0.2" is stored as the destination IP address. In such a case, the transfer processing unit 26 stores, in the ARP request, MAC address "M2" of the gateway 20a as the source MAC address. Furthermore, the transfer processing unit 26 stores, in the ARP request, "ff:ff:ff:ff:ff:ff", which is the broadcast address, as the destination MAC address and stores, in the ARP request, "192.168.0.2" as the target address. Then, the transfer processing unit 26 stores the generated ARP request in a frame and then outputs the frame to the sending/receiving unit 27.

Then, the sending/receiving unit 27 broadcasts the frame in which the ARP request is stored to the subnet 10 via the interface 28. Consequently, the server 40b whose IP address is "192.168.0.2" generates an ARP response that is used to send a MAC address as a notification. Specifically, the server 40b generates an ARP response in which the source MAC address of the ARP request is stored as the destination MAC address and the MAC address of the server 40b is stored as the source MAC address. Then, the server 40b stores the ARP response in a frame in which the MAC address of the gateway 20a is stored as the destination MAC address and then outputs the frame to the transfer device 30b.

FIG. 10B is a schematic diagram illustrating an example of the format of an ARP response. As illustrated in FIG. 10B, the server 40b generates an ARP response that includes the source MAC address, the destination MAC address, the source protocol address, and the payload. For example, the server 40b stores, in the ARP response, the MAC address "M1" of the server 40b as the source MAC address and stores the MAC address "M2" of the interface on the subnet 10 side of the gateway 20a as the destination MAC address. Furthermore, the server 40b stores the IP address "192.168.0.2" of the server 40b as the source protocol address. Then, the server 40b stores the ARP response in the frame destined for the gateway 20a and then sends the frame in which the ARP response is stored to the gateway 20a via the transfer device 30b and the transfer device 30a.

Consequently, the transfer processing unit 26 acquires the MAC address of the server 40b from the source MAC address in the ARP response. Furthermore, the transfer processing unit 26 stores the IP packet that is received from the message identifying unit 23 in the frame in which the MAC address of the server 40b is stored as the destination MAC address. Then, the transfer processing unit 26 outputs the frame to the sending/receiving unit 27.

When the sending/receiving unit 27 receives various frames from the transfer device 30a via the interface 28, the sending/receiving unit 27 outputs the received various frames to the message identifying unit 23. Furthermore, when the sending/receiving unit 27 receives a frame from the transfer processing unit 26, the sending/receiving unit 27 outputs the received frame to the transfer device 30a via the interface 28.

Figure 11:
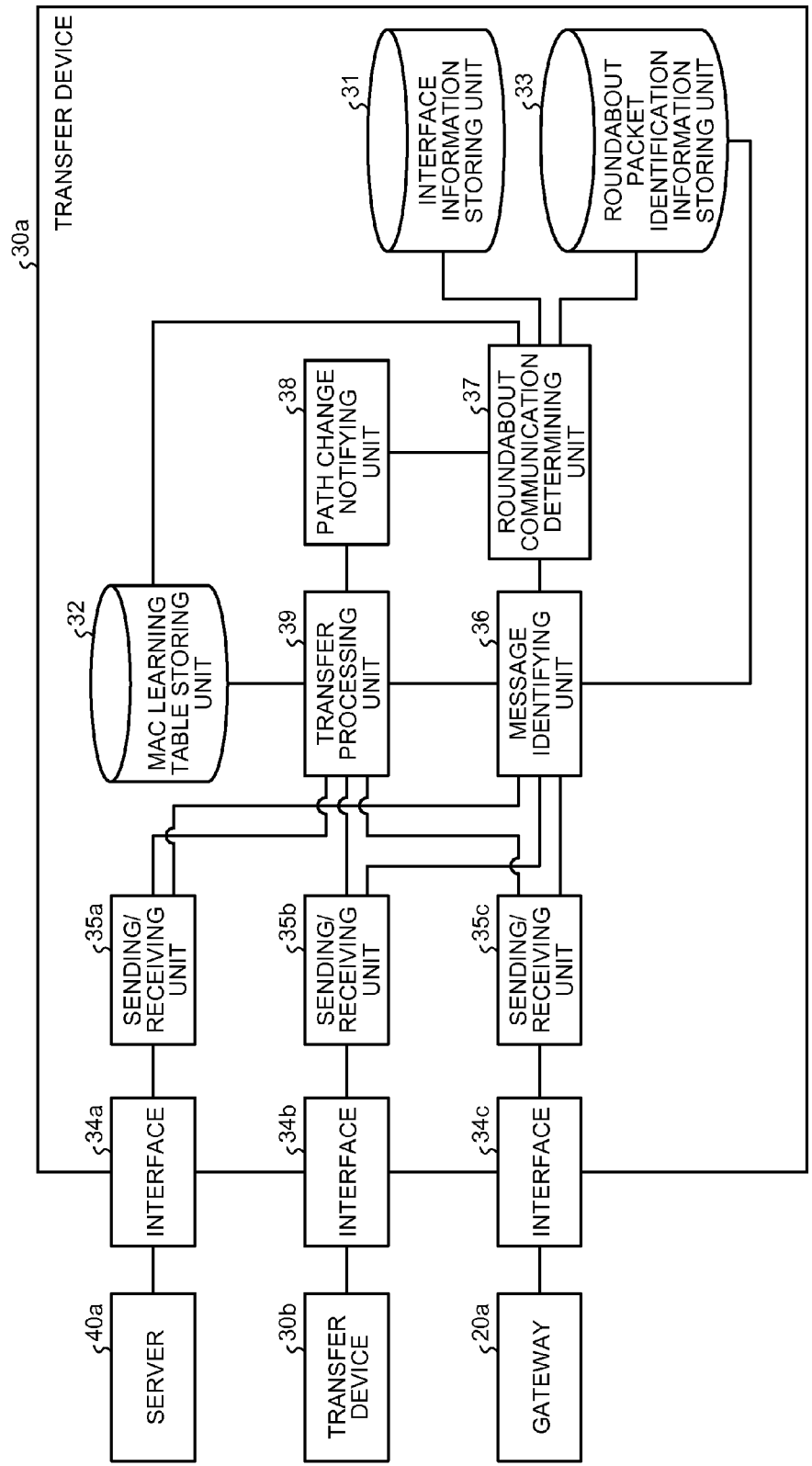
FIG. 11 is a schematic diagram illustrating an example of the functional configuration of a transfer device.

In the following, the functional configuration of the transfer device 30a will be described with reference to FIG. 11. FIG. 11 is a schematic diagram illustrating an example of the functional configuration of a transfer device. In the example illustrated in FIG. 11, the transfer device 30a includes an interface information storing unit 31, a MAC learning table storing unit 32, and a roundabout packet identification information storing unit 33. Furthermore, the transfer device 30a includes multiple interfaces 34a to 34c, multiple sending/receiving units 35a to 35c, a message identifying unit 36, a roundabout communication determining unit 37, a path change notifying unit 38, and a transfer processing unit 39.

The interface information storing unit 31 stores therein interface information indicating whether each of the interfaces 34a to 34c is connected to a LAN other than the LAN 11a.

FIG. 12 is a schematic diagram illustrating an example of interface information. In the example illustrated in FIG. 12, the interface information storing unit 31 stores therein, in an associated manner, the interface identifier and LAN communication information. The interface identifier mentioned here means information that identifies the interfaces 34a to 34c. The LAN communication information mentioned here means information indicating whether each of the interfaces 34a to 34c is connected to a LAN that is other than the LAN 11a.

In the example illustrated in FIG. 12, the interface information storing unit 31 stores therein, in an associated manner, the interface identifier "IF #1", which indicates the interface 34a, and the LAN communication information "No". Furthermore, the interface information storing unit 31 stores therein, in an associated manner, the interface identifier "IF #2", which indicates the interface 34b, and the LAN communication information "Yes". Furthermore, the interface information storing unit 31 stores therein, in an associated manner, the interface identifier "IF #3", which indicates the interface 34c, and the LAN communication information "No".

A description will be given here by referring back to FIG. 11. The MAC learning table storing unit 32 stores therein a MAC learning table that is used by the transfer device 30a for transferring a frame. For example, the MAC learning table storing unit 32 stores therein the MAC learning table illustrated in FIG. 13 as an example.

FIG. 13 is a schematic diagram illustrating an example of a MAC learning table included in the transfer device. As illustrated in FIG. 13, the MAC learning table storing unit 32 stores therein a MAC learning table in which a MAC address is associated with an output interface. The MAC address illustrated in FIG. 13 means the destination MAC address of the frame targeted for a transfer process. The output interface mentioned here means the interface identifier that indicates the interface that outputs the frame targeted for the transfer process.

For example, the MAC learning table storing unit 32 stores therein, in an associated manner, the MAC address "M1" of the server 40b and the interface identifier "IF #2" of the interface 34b. Furthermore, the MAC learning table storing unit 32 stores therein, in an associated manner, the MAC address "M2" of the gateway 20a and the interface identifier "IF #3" of the interface 34c.

Furthermore, the MAC learning table storing unit 32 stores therein, in an associated manner, the MAC address "M3" of the server 40a and the interface identifier "IF #1" of the interface 34a. Furthermore, the MAC learning table storing unit 32 stores therein, in an associated manner, the MAC address "M4" of the gateway 20b and the interface identifier "IF #2" of the interface 34b.

A description will be given here by referring back to FIG. 11. The roundabout packet identification information storing unit 33 stores therein a rule for determining whether a packet in a frame transferred by the transfer device 30a is a packet for packet communication passing through a roundabout path, i.e., is a roundabout packet. For example, the roundabout packet identification information storing unit 33 stores therein the information packet identification information illustrated in FIG. 14 as the rule for determining whether a packet is a roundabout packet.

Figure 14:
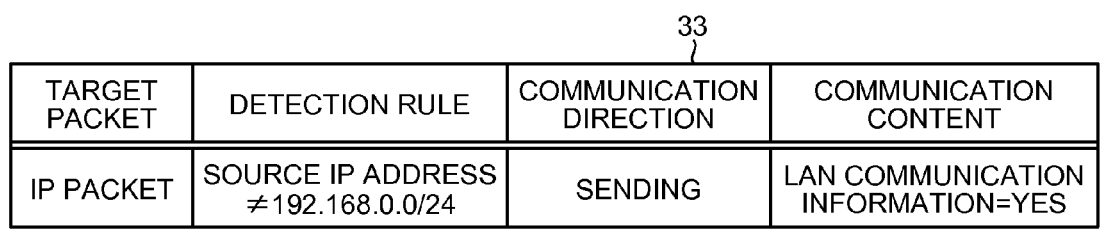
FIG. 14 is a schematic diagram illustrating an example of roundabout packet identification information stored in the transfer device.

FIG. 14 is a schematic diagram illustrating an example of roundabout packet identification information stored in the transfer device. As illustrated in FIG. 14, the roundabout packet identification information storing unit 33 stores therein roundabout packet identification information in which the target packet, the detection rule, the communication direction, and the communication content are associated with each other. The target packet mentioned here means the type of packet that is used when it is determined whether a packet in a received frame is a roundabout packet.

The detection rule mentioned here indicates the condition that is used to determine whether a packet in a received frame is a roundabout packet. The communication direction mentioned here indicates the communication direction of a frame that is used when it is determined whether a communication path is a roundabout path. The communication content mentioned here means information that is used to identify whether the destination of a frame is a LAN other than the LAN 11a and, specifically, is information that indicates whether LAN communication information on an interface that outputs a packet indicates "Yes".

In the example illustrated in FIG. 14, the roundabout packet identification information storing unit 33 stores therein, in an associated manner, the target packet "IP packet", the detection rule "source IP address≠192.168.0.0/24", the communication direction "sending", and the communication content "LAN communication information=Yes". Consequently, when the transfer device 30a stores therein the roundabout packet identification information illustrated in FIG. 14, the transfer device 30a determines, when sending a frame, whether the connection destination of the interface that outputs a frame is a LAN other than the LAN 11a, i.e., is the LAN 11b.

Furthermore, when the connection destination of the interface that outputs a frame is the LAN 11b, the transfer device 30a identifies the type of a packet in a frame to be sent. Furthermore, when the type of a packet is an IP packet, the transfer device 30a checks the source IP address of the packet. When the source IP address of the "IP packet" is not "192.168.0.0/24", i.e., when an external device outside the subnet 10 is the source of the packet, the transfer device 30a determines that the packet in the received frame is a roundabout packet.

The roundabout packet identification information stored in the roundabout packet identification information storing unit 33 is not limited to the information illustrated in FIG. 14 as an example. Specifically, any condition may also be set as the roundabout packet identification information as long as it is possible to determine whether the packet in a frame that is sent/received to/from the transfer device 30b in the LAN 11b is a packet related to communication between the terminal device 2 and one of the servers 40a and 40b in the subnet 10.

For example, the transfer device 30a may also store therein roundabout packet identification information in which the target packet is an "IP packet", the detection rule is "destination IP address≠192.168.0.0/24", and the communication direction is "receiving". Specifically, when the destination of the IP packet received from the transfer device 30b is an external device outside the subnet 10, the transfer device 30a may also determine that the received packet is a roundabout packet.

A description will be given here by referring back to FIG. 11. The interfaces 34a to 34c are ports included in, for example, the transfer device 30a and each send/receive packets to/from each device that is connected to the corresponding interface. Here, the interface 34a is connected to the server 40a. The interface 34b is connected to the transfer device 30b. The interface 34c is connected to the gateway 20a.

When the sending/receiving units 35a to 35c receive various frames from the interfaces 34a to 34c, respectively, the sending/receiving units 35a to 35c each output the received frames to the message identifying unit 36. When the sending/receiving unit 35a receives a frame from the transfer processing unit 39, the sending/receiving unit 35a sends the received frame to the server 40a. When the sending/receiving unit 35b receives a frame from the transfer processing unit 39, the sending/receiving unit 35b sends the received frame to the transfer device 30b. When the sending/receiving unit 35c receives a frame from the transfer processing unit 39, the sending/receiving unit 35c sends the received frame to the gateway 20a.

When the message identifying unit 36 receives a frame from one of the sending/receiving units 35a to 35b, the message identifying unit 36 determines the type of packet in the frame. Specifically, the message identifying unit 36 determines whether the packet in the received frame is one of an IP packet, an ARP request, and an ARP response. Furthermore, the message identifying unit 36 checks the target packet that is stored in the roundabout packet identification information in the roundabout packet identification information storing unit 33.

When the type of packet in the received frame matches the target packet in the roundabout packet identification information, the message identifying unit 36 outputs the received frame to both the roundabout communication determining unit 37 and the transfer processing unit 39. For example, when the type of packet in the received frame is an "IP packet" and when the target packet in the roundabout packet identification information is an "IP packet", the message identifying unit 36 outputs the received frame to both the roundabout communication determining unit 37 and the transfer processing unit 39. In contrast, when the type of packet in the received frame does not match the target packet in the roundabout packet identification information, the message identifying unit 36 outputs the received frame to the transfer processing unit 39.

When the roundabout communication determining unit 37 receives a frame from the message identifying unit 36, the roundabout communication determining unit 37 determines whether the packet is a roundabout packet in accordance with the type of packet in the received frame, the source IP address, and the interface that sends the packet. In the following, the function performed by the roundabout communication determining unit 37 will be described in detail.

When the roundabout communication determining unit 37 receives a frame from the message identifying unit 36, the roundabout communication determining unit 37 acquires the roundabout packet identification information that is stored in the roundabout packet identification information storing unit 33. Then, the roundabout communication determining unit 37 determines whether the IP packet in the received frame satisfies the detection rule and the communication direction that are stored in the roundabout packet identification information. Then, when the IP packet in the received frame satisfies the roundabout packet identification information, the roundabout communication determining unit 37 outputs the IP packet in the frame to the path change notifying unit 38. In contrast, when the IP packet in the received frame does not satisfy the roundabout packet identification information, the roundabout communication determining unit 37 discards the received frame.

In the following, an example of a process performed by the roundabout communication determining unit 37 will be described. A description will be given below of an example in which the roundabout packet identification information storing unit 33 stores therein the roundabout packet identification information illustrated in FIG. 14. For example, the roundabout communication determining unit 37 determines whether the source IP address in an IP packet in a frame is a value other than "192.168.0.0/24". When the source IP address in an IP packet in a frame is a value other than "192.168.0.0/24", the roundabout communication determining unit 37 identifies the destination MAC address of the received frame. Then, the roundabout communication determining unit 37 reads, from the MAC learning table storing unit 32, the interface identifier of the output interface that is associated with the identified destination MAC.

Then, the roundabout communication determining unit 37 checks the interface information that is stored in the interface information storing unit 31 and then determines whether the LAN communication information associated with the read interface identifier indicates "Yes". When the LAN communication information associated with the read interface identifier indicates "Yes", the roundabout communication determining unit 37 outputs the packet in the received frame to the path change notifying unit 38.

Specifically, when the transfer device 30a sends a frame to the LAN 11b, the transfer device 30a determines, on the basis of the source IP address of the IP packet in the frame, whether the IP packet in the frame is an IP packet that is related to communication between the terminal device 2 and one of the servers 40a and 40b. When it is determined that the IP packet to be sent to the LAN 11 is an IP packet that is related to communication between the terminal device 2 and the subnet 10, the transfer device determines that the communication path is a roundabout path.

When the path change notifying unit 38 receives an IP packet from the roundabout communication determining unit 37, the path change notifying unit 38 reads the source IP address and the destination IP address stored in the received IP packet. Then, the path change notifying unit 38 stores the read source IP address and the destination IP address in a roundabout notification message in which the roundabout flag is "ON" and then outputs the message to the transfer processing unit 39.

By using the MAC learning table stored in the MAC learning table storing unit 32, the transfer processing unit 39 executes a transfer process on a frame received from the message identifying unit 36. Specifically, when the transfer processing unit 39 receives a frame from the message identifying unit 36, the transfer processing unit 39 specifies an output interface that is associated with the destination MAC address in the received frame. Then, the transfer processing unit 39 outputs the received frame to the sending/receiving unit that is associated with the specified interface.

Furthermore, when the transfer processing unit 39 receives a roundabout notification message from the path change notifying unit 38, the transfer processing unit 39 stores the received roundabout notification message in the frame and then outputs the frame to the sending/receiving unit 35c. Specifically, the transfer processing unit 39 stores a roundabout notification message in the frame in which the MAC address "M2" of the gateway 20a is stored as the destination MAC address and then sends the frame to the gateway 20a.

Figure 15:
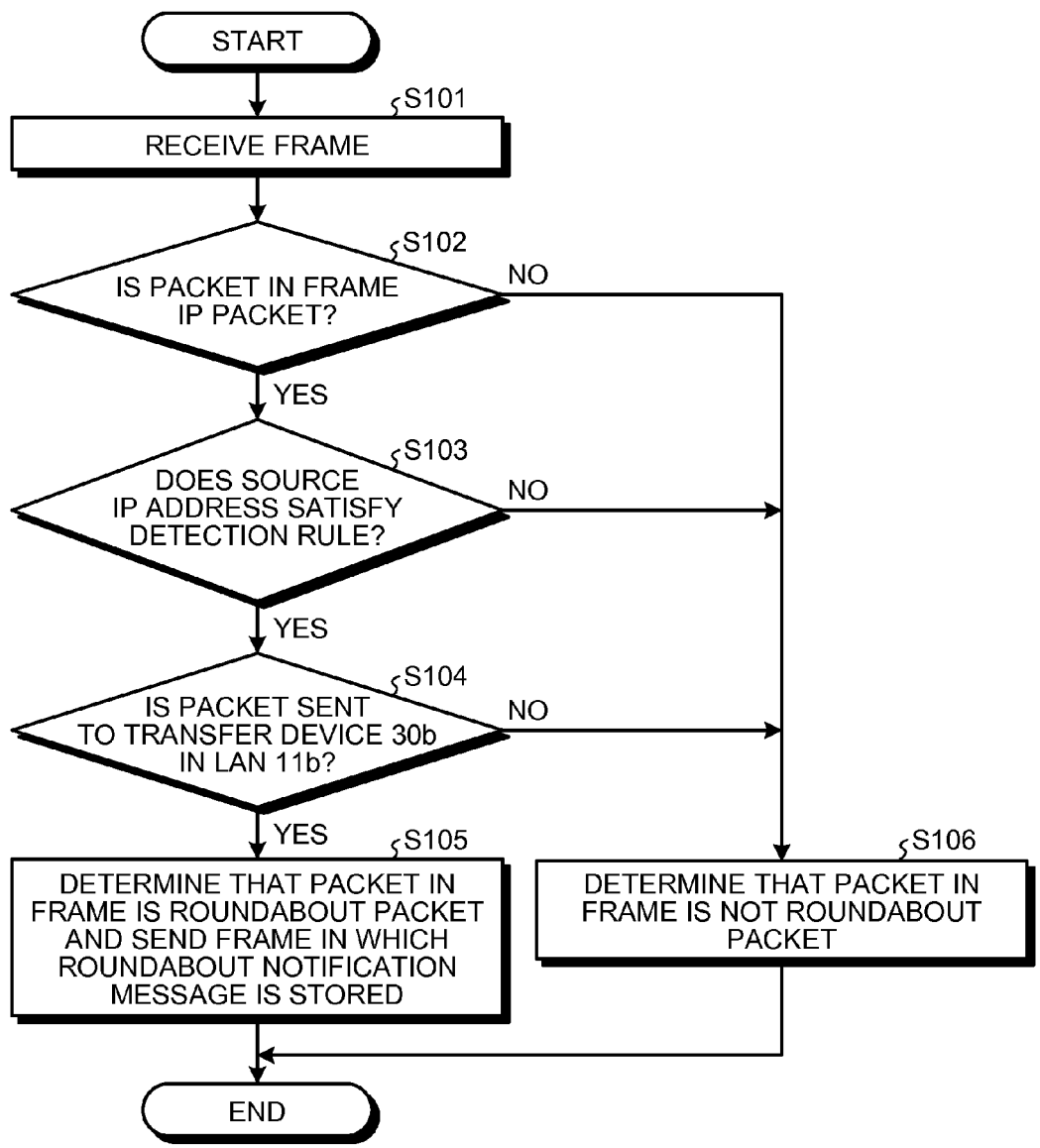
FIG. 15 is a flowchart illustrating the flow of a determining process performed on a roundabout packet.

In the following, the flow of a process for determining whether a packet that is sent by the transfer device 30a to the transfer device 30b is a roundabout packet will be described with reference to FIG. 15. FIG. 15 is a flowchart illustrating the flow of a determining process performed on a roundabout packet.

First, when the transfer device 30a receives a frame from one of the gateway 20a, the transfer device 30b, and the server 40a (Step S101), the transfer device 30a determines whether the type of packet in the received frame is an IP packet (Step S102). When the type of packet in the received frame is an IP packet (Yes at Step S102), the transfer device 30a determines whether the source IP address in the IP packet in the received frame satisfies the detection rule (Step S103).

When the source IP address in the packet in the received frame satisfies the detection rule (Yes at Step S103), the transfer device 30a determines whether the packet in the received frame is to be sent to the transfer device 30b in the LAN 11b (Step S104). Specifically, the transfer device 30a determines whether the frame is to be sent via the link that connects the LAN 11a and the LAN 11b. When the transfer device 30a sends the received frame to the transfer device 30b in the LAN 11b (Yes at Step S104), the transfer device 30a determines that the packet in the received frame is a roundabout packet and then sends a roundabout notification message to the terminal device 2 (Step S105). Then, the transfer device 30a ends the process.

In contrast, when the type of packet in the received frame is not an IP packet (No at Step S102), the transfer device 30a determines that the packet in the received frame is not a roundabout packet (Step S106) and then ends the process. Furthermore, when the source IP address of the packet in the received frame does not satisfy the detection rule (No at Step S103), the transfer device 30a determines that the packet in the received frame is not a roundabout packet (Step S106) and then ends the process. Furthermore, when the transfer device 30a sends the received frame to a device other than the transfer device 30b in the LAN 11b (No at Step S104), the transfer device 30a determines that the packet in the received frame is not a roundabout packet (Step S106) and then ends the process.

[Advantage of the First Embodiment]

As described above, the transfer device 30a sends/receives a frame to/from the transfer device 30b that is included in the LAN 11b. Furthermore, on the basis of the source IP address of a packet in a frame that is sent to the transfer device 30b, the transfer device 30a determines whether the packet in the frame that is to be sent is a packet related to packet communication between the server 40b and the terminal device 2. When it is determined that the packet in the frame to be sent is a packet related to packet communication between the server 40b and the terminal device 2, the transfer device 30a sends a roundabout notification message to the terminal device 2.

Consequently, the transfer device 30a can prevent packet communication from being performed via a roundabout path. Specifically, the transfer device 30a can determine, by using only a network address of the subnet 10, whether an IP packet in a frame to be sent is a roundabout packet. Consequently, the transfer device 30a can prevent packet communication from being performed via a roundabout path without managing which of the servers 40a and 40b is installed in which of the LANs 11a and 11b.

Furthermore, the network address of the subnet 10 is information that does not need to be changed after the network address is set once. Consequently, the communication system 1 can, at a substantially constant management cost, prevent packet communication from being performed via a roundabout path regardless of the number of servers or virtual machines included in the subnet 10.

Furthermore, on the basis of the source IP address of an IP packet in a frame that is to be sent or on the basis of the destination IP address of an IP packet in a received frame, the transfer device 30a determines whether a packet to be sent/received is a packet related to packet communication between the terminal device 2 and the server 40b. Then, when it is determined that the packet in the frame to be sent/received to/from the transfer device 30b is a packet related to packet communication between the terminal device 2 and the server 40b, the transfer device 30a determines that the packet is a roundabout packet and then sends a roundabout notification message to the terminal device 2. Consequently, the transfer device 30a can prevent packet communication from being performed via a roundabout path.

Furthermore, when the transfer device 30a determines that an IP packet in a frame to be sent to the transfer device 30b is a roundabout packet, the transfer device 30a sends a roundabout notification message to the terminal device 2 that is indicated by the source IP address in the IP packet. Specifically, when a terminal device that is the same type as the terminal device 2 accesses the subnet 10, the transfer device 30a can send the roundabout notification message only to a terminal device that performs the packet communication by using a roundabout path.

Furthermore, the transfer device 30a instructs the terminal device 2 to switch the gateway that is used when an IP packet is sent to a server that is the destination of the IP packet that was identified to be a roundabout packet. Consequently, when the terminal device 2 simultaneously performs packet communication with multiple servers 40a and 40b, the transfer device 30a can individually shorten the communication path for each piece of the packet communication.

Furthermore, when the source IP address of an IP packet in a frame to be sent is the IP address of the terminal device 2, the transfer device 30a sends a roundabout notification message to the gateway 20a that is installed in the same LAN 11a as the transfer device 30a. When the gateway 20a receives the roundabout notification message, the gateway 20a sends the received roundabout notification message to the terminal device 2 that is the source of the IP packet that is determined to be a roundabout packet. Consequently, the gateway 20a can send the roundabout notification message by tracking back along the same path as that used by the IP packet sent by the terminal device 2.

[b] Second Embodiment

The transfer device 30a sends a roundabout notification message via the gateway 20a; however, the embodiment is not limited thereto. For example, the transfer device 30a acquires, from an IP packet in a frame that is sent/received to/from the transfer device 30b, an IP address of the terminal device that is the destination of a roundabout notification message. Furthermore, by using the acquired IP address, the transfer device 30a acquires the MAC address of the terminal device that is the destination of the roundabout notification message. Then, the transfer device 30a stores the roundabout notification message in a frame in which the acquired MAC address is stored as the destination MAC address and then may also directly send the frame to the terminal device.

Furthermore, for example, when the transfer device 30a determines that the packet in the received frame is a roundabout packet, the transfer device 30a notifies the terminal device 2 of the switching of the gateways; however, the embodiment is not limited thereto. For example, after the transfer device 30a stores therein the IP address of the gateway 20b included in the LAN 11b and determines that the packet in the received frame is a roundabout packet, the transfer device 30a may also notify the terminal device 2 of the IP address of the gateway 20b as a gateway that is used after the switching of gateways.

FIG. 16 is a schematic diagram illustrating a first variation of the interface information. In the example illustrated in FIG. 16, instead of the interface information illustrated in FIG. 12, the interface information storing unit 31 stores therein interface information in which the interface identifier, LAN communication information, and the IP address of a gateway that is included in a LAN at the connection destination are associated with each other.

For example, the interface information storing unit 31 stores therein, in an associated manner, the interface identifier "IF #2" of the interface 34b that is connected to the transfer device 30b in the LAN 11b and the LAN communication information "Yes". Furthermore, the interface information storing unit 31 stores therein, in an associated manner, the interface identifier "IF #2" and the IP address "10.0.2.2" of the gateway 20b included in the LAN 11b.

When the roundabout communication determining unit 37 determines that a packet in a received frame is a roundabout packet, the roundabout communication determining unit 37 reads, from the interface information, the IP address "10.0.2.2" of the gateway that is included in the LAN at the connection destination. Then, the roundabout communication determining unit 37 notifies the path change notifying unit 38 of the IP address "10.0.2.2" of the read gateway. Thereafter, the path change notifying unit 38 generates a roundabout notification message in which the IP address "10.0.2.2" of the gateway 20b is stored.

FIG. 17 is a schematic diagram illustrating a variation of the format of the roundabout notification message. As illustrated in FIG. 17, the roundabout communication determining unit 37 generates a roundabout notification message in which the IP address "10.0.2.2" of the gateway is stored in the roundabout notification message that is illustrated in FIG. 6 and then outputs the message to the transfer processing unit 39. Then, the transfer processing unit 39 stores, in a frame, the roundabout notification message in which the IP address of the gateway 20b is stored and then sends the frame to the terminal device 2.

Consequently, the routing table updating unit 19 in the terminal device 2 updates the routing table 12a as illustrated in FIG. 18. FIG. 18 is a schematic diagram illustrating a variation of the updated routing table. In the example illustrated in FIG. 18, the routing table updating unit 19 receives the frame in which the roundabout notification message illustrated in FIG. 17 is stored. In such a case, the routing table updating unit 19 extracts the roundabout notification message from the received frame and adds an entry in which the destination IP address, which is in the extracted roundabout notification message, and the mask value "192.168.0.2/32" are stored.

Specifically, the routing table updating unit 19 stores, in the added entry, the IP address "10.0.2.2" of the gateway that is stored in the roundabout notification message. Furthermore, when sending a packet in which the destination IP address of "192.168.0.2" is stored, the routing table updating unit 19 stores, in the added entry, the communication cost "5" that is lower than the other communication costs so that the gateway 20b is selected.

Furthermore, the transfer device 30a may also determine, in accordance with whether a failure has occurred in the gateway 20b, whether a packet in a received frame is a roundabout packet. In the following, a description will be given of a process for determining, in accordance with whether a failure has occurred in the gateway 20b, whether a packet in a received frame is a roundabout packet.

FIG. 19 is a schematic diagram illustrating a second variation of the interface information. As illustrated in FIG. 19, the transfer device 30a stores therein a failure flag by associating the failure flag with each of the entries in the interface information illustrated in FIG. 16. The failure flag mentioned here is a flag that indicates whether a failure has occurred in a gateway to which the associated IP address is allocated. For example, in the example illustrated in FIG. 19, the LAN communication information "Yes", the IP address "10.0.2.2" of the gateway 20b, and the failure flag "ON" are stored in the interface identifier "IF #2". Consequently, the transfer device 30a determines that a failure has occurred in the gateway 20b.

The transfer device 30a determines whether a failure has occurred in the gateway 20a. When a failure has occurred, the gateway 20a may notify the transfer device 30b that the failure has occurred. For example, the transfer device 30a sends a ping message to the gateway 20a at predetermined time intervals. Then, when the number of times the transfer device 30a is not able to receive a response to the ping message from the gateway 20a exceeds a predetermined number of times, the transfer device 30a determines that a failure has occurred in the gateway 20a.

Thereafter, when a failure has occurred in the gateway 20a, the transfer device 30a sends, to the transfer device 30b, a notification indicating that a failure has occurred in the gateway 20a and also indicating that the IP address of the gateway 20a is "10.10.1.1". Similarly to the transfer device 30b, the transfer device 30b determines whether a failure has occurred in the gateway 20b. When a failure has occurred, the transfer device 30b notifies the transfer device 30a that a failure has occurred in the gateway 20b.

For example, when the transfer device 30b determines that a failure has occurred in the gateway 20b, the transfer device 30b sends, to the transfer device 30a, a notification indicating that a failure has occurred in the gateway 20b and also indicating that the IP address of the gateway 20b is "10.0.2.2". When the transfer device 30a receives, from the transfer device 30b, a notification that a failure has been occurred in the gateway 20b, the transfer device 30a searches the interface information for an entry in which the IP address "10.0.2.2" of the gateway 20b is stored. Then, the transfer device 30a changes the failure flag in the searched for entry to "ON".

Furthermore, when the transfer device 30a receives a frame in which an IP packet is stored, the transfer device 30a determines whether an interface that outputs an IP packet in a frame is connected to the transfer device 30b in the LAN 11b. Furthermore, when an interface that outputs an IP packet in a frame is connected to the transfer device 30b in the LAN 11b, the transfer device 30a determines whether the source IP address in the IP packet is within the range of the network addresses of the subnet 10.

Furthermore, when the source IP address in an IP packet in a frame is not the IP address of the subnet 10, the transfer device 30a determines whether the failure flag associated with the interface identifier of an interface that outputs the frame is "ON". When the failure flag associated with the interface identifier of an interface that outputs the frame is "ON", the transfer device 30a relays the frame. In contrast, when the failure flag is "OFF", the transfer device 30a sends a roundabout notification message to the terminal device 2 in addition to relaying the frame.

Specifically, when the transfer device 30a sends, to the transfer device 30b, an IP packet related to packet communication between the terminal device 2 and the server 40b, if a failure has occurred in the gateway 20b, the transfer device 30a determines that the communication path is not a roundabout path. Consequently, when a failure has occurred in the gateway 20b, the transfer device 30a does not prevent packet communication between the LAN 11b and the terminal device 2 from being performed via a roundabout path. Consequently, even if one of the gateways 20a and 20b has failed, the transfer device 30a can continue packet communication between the subnet 10 and the terminal device 2.

The process described above may also be implemented by adding a new function to the transfer device 30a or may also be implemented by, for example, the transfer processing unit 39, the message identifying unit 36, and the roundabout communication determining unit 37. For example, the transfer processing unit 39 sends a ping to the gateway 20a.

Furthermore, the message identifying unit 36 outputs a response from the gateway 20a to the roundabout communication determining unit 37. When the roundabout communication determining unit 37 does not receive a reply from the gateway 20a a predetermined number of times, the roundabout communication determining unit 37 may also send a notification that the gateway 20a has failed to the transfer device 30b via the path change notifying unit 38 and the transfer processing unit 39.

Furthermore, the message identifying unit 36 outputs a notification that the gateway 20b has failed to the roundabout communication determining unit 37. When the roundabout communication determining unit 37 receives the notification that the gateway 20b has failed, the roundabout communication determining unit 37 sets the failure flag associated with the IP address of the gateway 20b to "ON".

Figure 20:
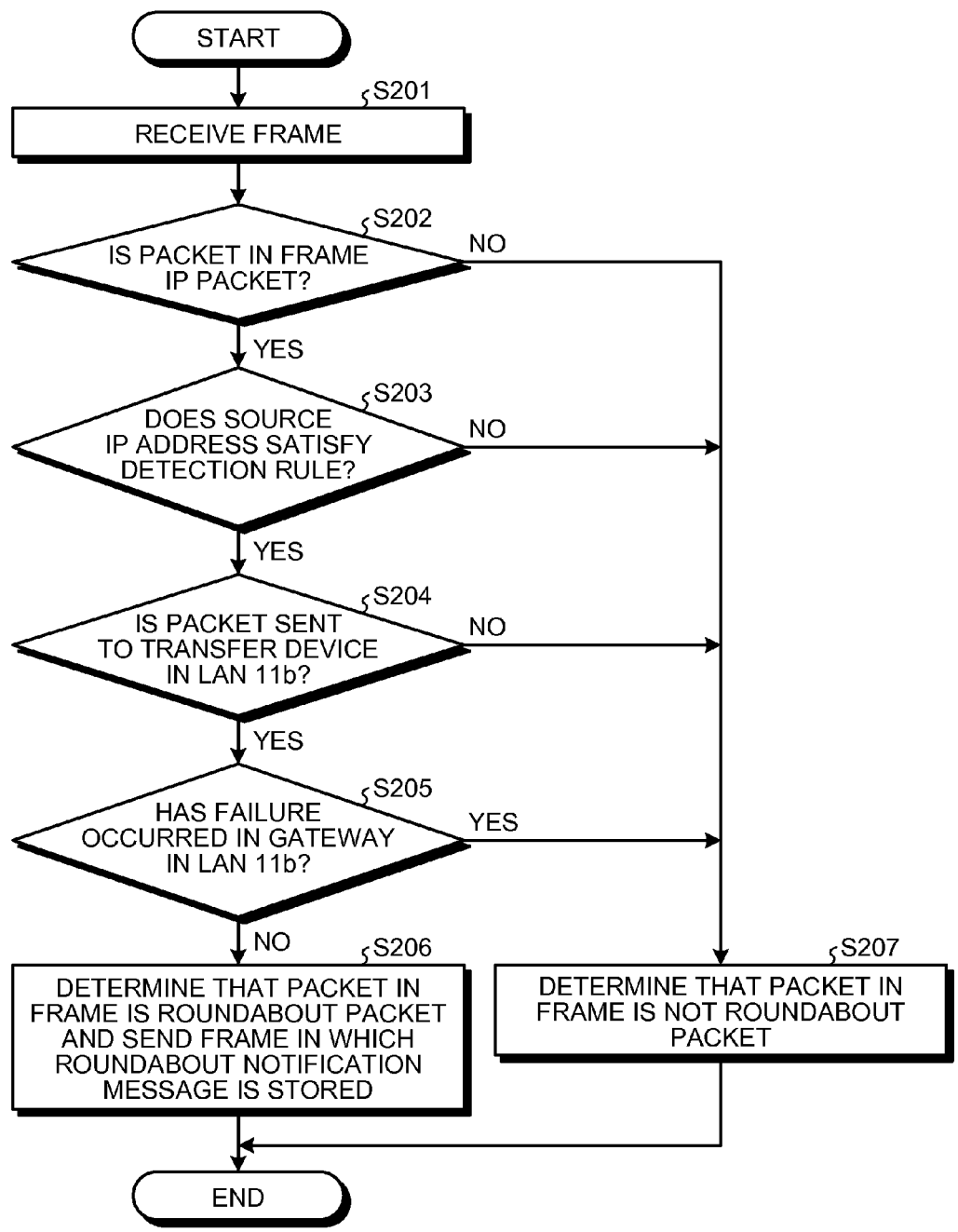
FIG. 20 is a flowchart illustrating a variation of the roundabout packet determining process.

In the following, the flow of a process for determining whether a packet is a roundabout packet in accordance with whether the gateways 20a or 20b has failed will be described with reference to FIG. 20. FIG. 20 is a flowchart illustrating a variation of the roundabout packet determining process. In the example illustrated in FIG. 20, it is assumed that the transfer device 30a stores therein the roundabout packet identification information illustrated in FIG. 14.

First, when the transfer device 30a receives a frame from one of the gateway 20a, the transfer device 30b, and the server 40a (Step S201), the transfer device 30a determines whether the type of packet in the received frame is an IP packet (Step S202). When the type of packet in the received frame is an IP packet (Yes at Step S202), the transfer device 30a determines whether the source IP address in the IP packet in the received frame satisfies the detection rule (Step S203).

When the source IP address in the IP packet in the received frame satisfies the detection rule (Yes at Step S203), the transfer device 30a determines whether the IP packet in the frame is to be sent to the transfer device 30b (Step S204).

When it is determined that the IP packet in the frame is sent to be to the transfer device 30*b* (Yes at Step S204), the transfer device 30*a* determines whether a failure has occurred in the gateway 20*b* in the LAN 11*b* (Step S205). When it is determined that a failure has not occurred in the gateway 20*b* in the LAN 11*b* (No at Step S205), the transfer device 30*a* performs the following process. Namely, the transfer device 30*a* determines that the IP packet in the received frame is a roundabout packet, sends a roundabout notification message to the terminal device 2 (Step S206), and then ends the process.

In contrast, when the type of packet in the received frame is not an IP packet (No at Step S202), the transfer device 30*a* determines that the IP packet in the received frame is not a roundabout packet (Step S207) and ends the process. Furthermore, when the source IP address in the IP packet in the received frame does not satisfy the detection rule (No at Step S203), the transfer device 30*a* determines that the IP packet in the received frame is not a roundabout packet (Step S207) and ends the process.

Furthermore, when the transfer device 30*a* does not send the received IP packet to the LAN 11*b* (No at Step S204), the transfer device 30*a* determines that the IP packet in the received frame is not a roundabout packet (Step S207) and ends the process. Furthermore, when a failure has occurred in the gateway 20*b* in the LAN 11*b* (Yes at Step S205), the transfer device 30*a* determines that the IP packet in the received frame is not a roundabout packet (Step S207) and ends the process.

Figure 21:
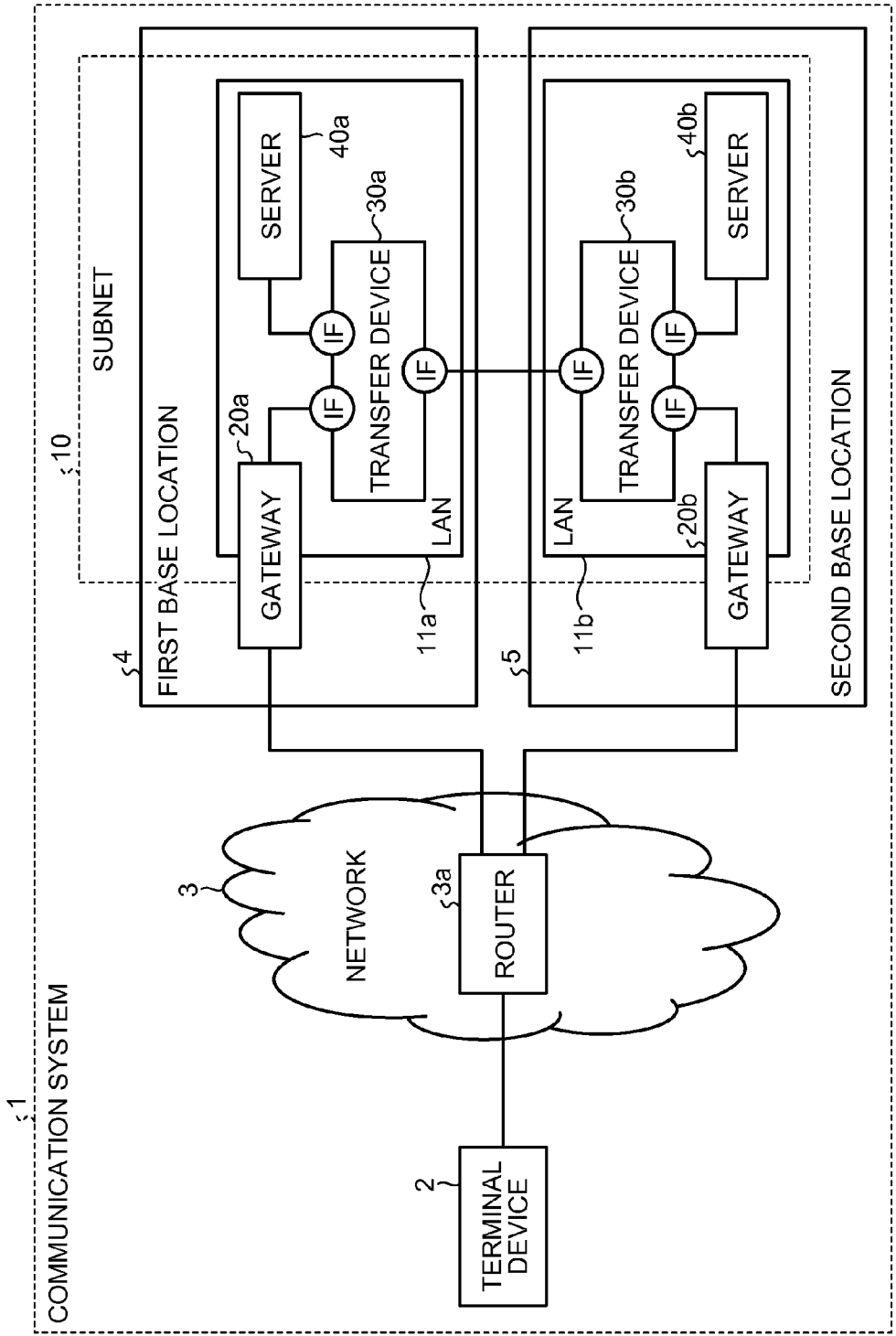
FIG. 21 is a schematic diagram illustrating a variation of the communication system.

As described above, the description thus far has been given of an example in which the transfer device 30*a* sends a roundabout notification message to the terminal device 2; however the embodiment is not limited thereto. For example, FIG. 21 is a schematic diagram illustrating a variation of the communication system. As illustrated in FIG. 21, the network 3 in the communication system 1 includes a router 3*a* that relays packet communication between the terminal device 2 and the subnet 10.

For example, instead of the terminal device 2, the router 3*a* stores therein the routing table illustrated in FIG. 4A. Furthermore, when the router 3*a* receives, from the terminal device 2, a frame that includes an IP packet in which the IP address of the subnet 10 is stored as the destination IP address, the router 3*a* identifies the IP address of a gateway that is associated with the destination IP address in the IP packet in the received frame. Then, the router 3*a* acquires the MAC address of the gateway by using the identified IP address and then relays the frame by using the acquired MAC address.

At this point, when the router 3*a* is installed in the network 3, the transfer device 30*a* sends a roundabout notification message to the router 3*a* instead of the terminal device 2. Consequently, similarly to the routing table updating unit 19, the router 3*a* updates the routing table; therefore, the router 3*a* can switch the gateways for packet communication performed via a roundabout path.

[Advantage of the Second Embodiment]

As described above, the transfer device 30*a* stores therein the IP address of the gateway 20*b* in the LAN 11*b* that includes the transfer device 30*b* as interface information on the interface that is connected to the transfer device 30*b*. Then, when the transfer device 30*a* determines that an IP packet to be sent to the transfer device 30*b* is a roundabout packet, the transfer device 30*a* sends, to the terminal device 2, a roundabout notification message in which the IP address of the gateway 20*b* is stored.

Consequently, the transfer device 30*a* can notify the gateway to which the terminal device 2 needs to send an IP packet. Consequently, even when the subnet 10 includes three or more LANs, the transfer device 30*a* can also prevent packet communication from being performed via a roundabout path.

Furthermore, the transfer device 30*a* may use arbitrary roundabout packet identification information; however, depending on the roundabout packet identification information to be used, the transfer device 30*a* can determine whether a gateway that relays a roundabout packet is the gateway 20*a* that is included in the same LAN as that used by the transfer device 30*a*. For example, when the source IP address in an IP packet in a frame that is to be sent to the transfer device 30*b* is the IP address of the terminal device 2, the transfer device 30*a* can determine that the IP packet in the frame is a roundabout packet that is transferred via the gateway 20*a*. Furthermore, when the source IP address of an IP packet in a frame that is received from the transfer device 30*b* is the IP address of the terminal device 2, the transfer device 30*a* can determine that the IP packet in the frame is a roundabout packet that is transferred via the gateway 20*b*.

Here, the transfer device 30*a* stores therein the IP address of the gateway 20*b* but does not store therein the IP address of the gateway 20*a*. Consequently, the transfer device 30*a* stores therein roundabout packet identification information by which it is determined whether a packet transferred via the gateway 20*a* is a roundabout packet. When the transfer device 30*a* determines that the transferred packet is a roundabout packet, the transfer device 30*a* determines that the transfer path via the gateway 20*a* is a roundabout path and then notifies the terminal device 2 of the IP address of the gateway 20*b*. Consequently, the transfer device 30*a* in the LAN 11*a* can eliminate a roundabout path performed via the gateway 20*a* that is installed in the same LAN 11*a*.

Furthermore, the transfer device 30*b* determines whether a failure has occurred in the gateway 20*b* that is installed in the same LAN 11*b*. When it is determined that a failure has occurred in the gateway 20*b*, the transfer device 30*b* notifies the transfer device 30*a* that the gateway 20*b* has failed. In such a case, the transfer device 30*a* stores therein information indicating that the gateway 20*b* has failed.

Furthermore, when the transfer device 30*a* determines that an IP packet in a frame that is transferred to the transfer device 30*b* is an IP packet related to packet communication between the terminal device 2 and the server 40*b*, the transfer device 30*a* determines whether the transfer device 30*b* has failed. When the transfer device 30*a* determines that the transfer device 30*b* has not failed, the transfer device 30*a* sends a roundabout notification message to the terminal device 2. When it is determined that the transfer device 30*b* has failed, the transfer device 30*a* does not send a roundabout notification message to the terminal device 2.

As described above, when the gateway 20*b* has failed, the transfer device 30*a* determines that the communication path for packet communication is not a roundabout path even when the IP packet of the packet communication that needs to pass through the gateway 20*a* passes through the gateway 20*b*. Therefore, the transfer device 30*a* prevents the terminal device 2 from selecting a failed gateway as a priority gateway. Consequently, even when the gateway has failed, the transfer device 30*a* can continue packet communication between the terminal device 2 and the subnet 10.

When the router 3*a* that relays packet communication between the terminal device 2 and one of the gateways 20*a* and 20*b* is present, the transfer device 30*a* sends a roundabout notification message to the router 3*a*. Consequently, the transfer device 30*a* can prevent the communication path from being a roundabout path even when the router 3*a* performs the routing of a packet related to packet communication between the terminal device 2 and the gateway 20a, 20b.

[c] Third Embodiment

In a third embodiment, a description will be given of a transfer device that determines, by using the destination address of an ARP response in a frame that is received from another LAN, whether a path for packet communication is a roundabout path.

Figure 22:
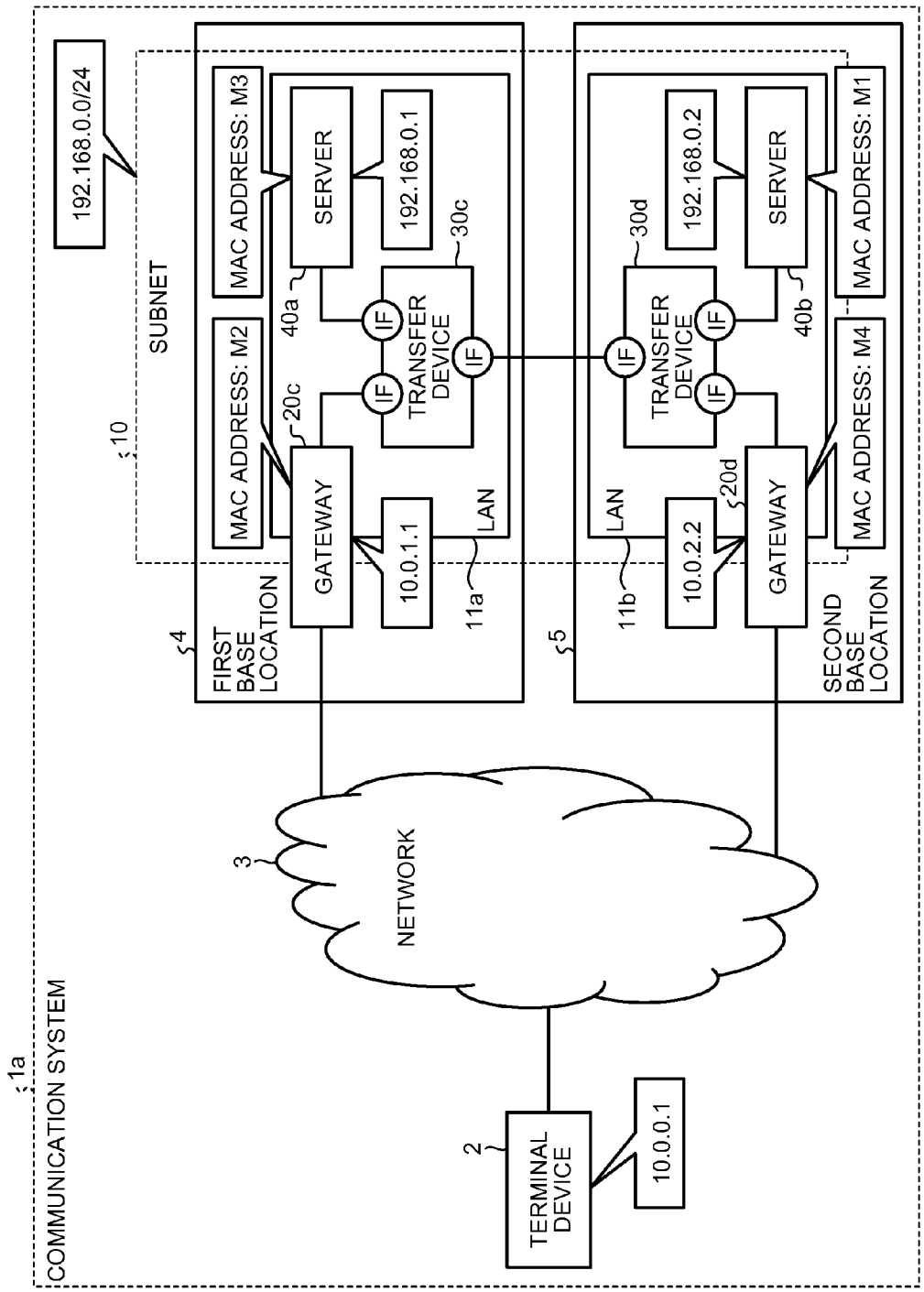
FIG. 22 is a schematic diagram illustrating a communication system according to a third embodiment.

FIG. 22 is a schematic diagram illustrating a communication system according to a third embodiment. The terminal device 2, the network 3, and the servers 40a and 40b in a communication system 1a illustrated in FIG. 22 have the same functions as those performed by the terminal device 2, the network 3, the servers 40a and 40b, respectively, illustrated in FIG. 1; therefore, descriptions thereof will be omitted. In the example illustrated in FIG. 22, the LAN 11a includes a gateway 20c and a transfer device 30c. The LAN 11b includes a gateway 20d and a transfer device 30d. It is assumed that the gateway 20d and the transfer device 30d perform the same function as that performed by the gateway 20c and the transfer device 30c, respectively; therefore, descriptions thereof will be omitted.

Similarly to the gateway 20a, the gateway 20c relays an IP packet related to the packet communication between each of the servers 40a and 40b and the terminal device 2. Furthermore, when the gateway 20c sends an ARP request, the gateway 20c stores therein, in an associated manner, the destination IP address in an IP packet that triggers an ARP request, and the source IP address.

When the gateway 20c receives a roundabout notification message from the transfer device 30c, the gateway 20c identifies the source IP address that is associated with the destination IP address included in the received roundabout notification message. Then, the gateway 20c sends a roundabout notification message in which the identified source IP address is stored as the destination.

In accordance with whether a packet in a frame sent/received to/from the transfer device 30d in the LAN 11b is a packet related to packet communication between the terminal device 2 and one of the servers 40a and 40b, the transfer device 30c determines whether a communication path is a roundabout path. Specifically, in accordance with whether the destination of an ARP response in a frame received from the transfer device 30d is the gateway 20c, the transfer device 30c determines whether a communication path is a roundabout path.

In the following, the function performed by the transfer device 30c will be described in detail. In the description below, it is assumed that the terminal device 2 sends, to the gateway 20c, a frame that stores therein an IP packet in which the server 40b is stored as the destination. For example, the gateway 20c receives a frame that stores therein an IP packet in which the source IP address of "10.0.0.1" and the destination IP address of "192.168.0.2" are stored. In such a case, the gateway 20c stores therein, in an associated manner, the destination IP address and the source IP address in the IP packet in the received frame. Then, the gateway 20c broadcasts, to the subnet 10, a frame that stores therein an ARP request in which the received destination IP address "192.168.0.2" is stored.

Consequently, the transfer device 30c transfers the frame in which the ARP request is stored to the transfer device 30d. Furthermore, the transfer device 30d transfers the frame in which the ARP request is stored to the server 40b. In such cases, because the destination IP address in the ARP request in the received frame matches the IP address "192.168.0.2" of the server 40b, the server 40b generates an ARP response in which the MAC address "M1" of the server 40b is stored.

Then, the server 40b stores the ARP response in a frame in which the source MAC address of the ARP request, i.e., the MAC address of the gateway 20c, is stored as the destination MAC address and then sends the frame to the transfer device 30d. Consequently, the gateway 20c receives the frame in which the ARP response is stored via the transfer device 30d and the transfer device 30c. In the description below, the receiving of a frame in which an ARP response is stored may sometimes be described as an "ARP response is received".

Here, when the transfer device 30c receives the frame in which the ARP response is stored from the transfer device 30d, the transfer device 30c determines whether the destination MAC address in the ARP response in the received frame matches the MAC address of the gateway 20c. When the destination MAC address in the ARP response in the received frame matches the MAC address of the gateway 20c, the transfer device 30c reads the source IP address from the ARP request in the frame. Then, the transfer device 30c stores a roundabout notification message, in which the read source IP address is stored in the destination IP address, in the frame destined for the gateway 20c and then sends the frame to the gateway 20c.

When the gateway 20c receives the frame in which the roundabout notification message is stored from the transfer device 30c, the gateway 20c reads the source IP address that is stored in the roundabout notification message in the received frame. Then, the gateway 20c identifies the destination IP address that is associated with the read source IP address. Then, the gateway 20c stores the identified destination IP address in the roundabout notification message and then sends the roundabout notification message to the terminal device 2.

Specifically, when the transfer device 30c receives, from the transfer device 30d, a frame that stores therein an ARP response in which the gateway 20c is stored as the destination, it can be determined that the gateway 20c has received, from the terminal device 2, an IP packet in which the server 40b is stored as the destination. Here, when the gateway 20c receives, from the terminal device 2, an IP packet in which the server 40b is stored as the destination, because the frame that stores therein the IP packet in which the server 40b is stored as the destination is transferred from the LAN 11a to the LAN 11b, the communication path is a roundabout path. Consequently, when the transfer device 30c receives, from the transfer device 30d, a frame that stores therein an ARP response in which the gateway 20c is stored as the destination, it is determined that the communication path related to the IP packet that triggers the sending of the ARP response is a roundabout path.

In the following, a description will be given, by using the drawings, of an example of the functional configuration of each of the gateway 20c and the transfer device 30c according to the third embodiment. First, an example of the functional configuration of the gateway 20c will be described with reference to FIG. 23.

Figure 23:
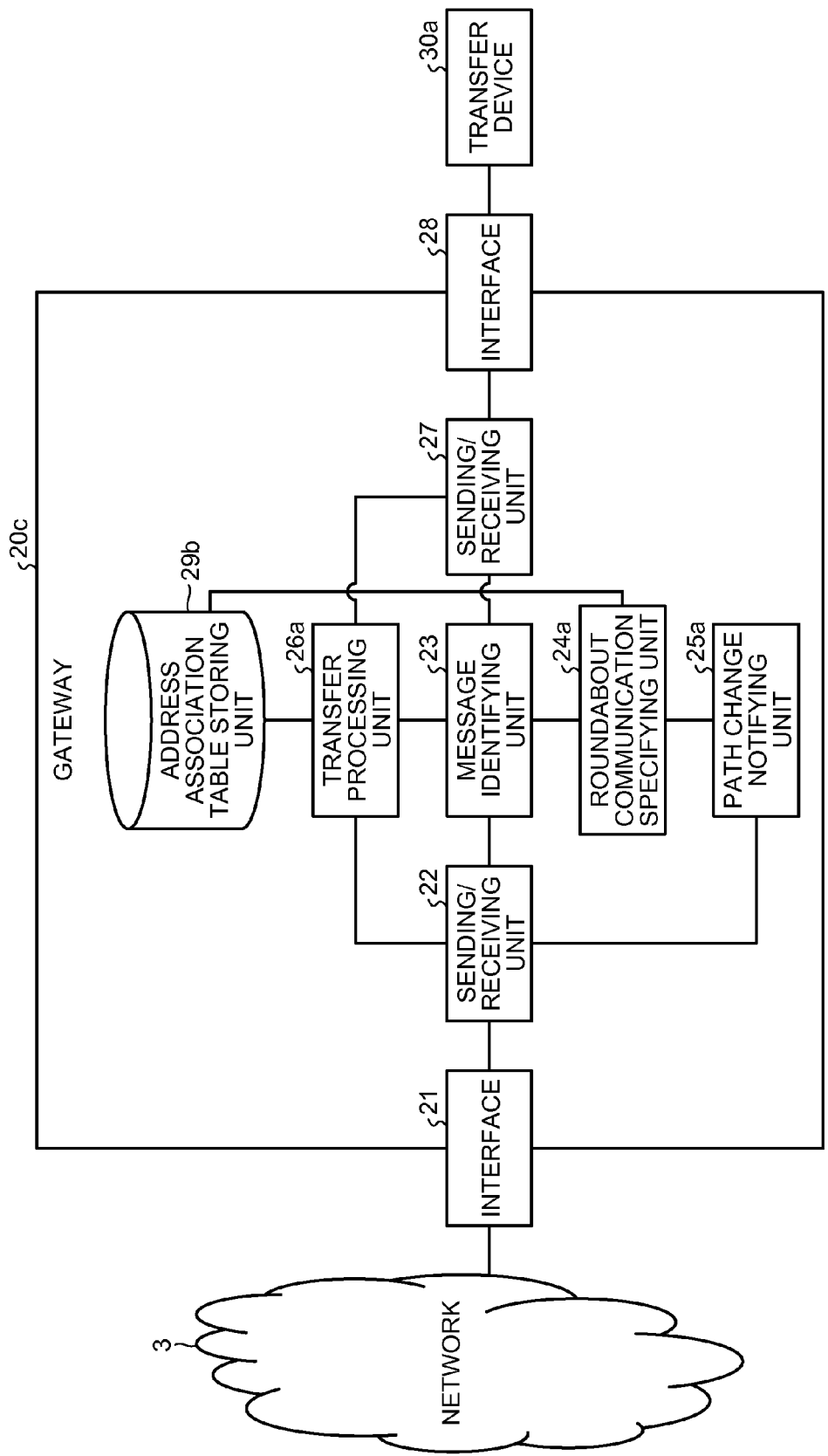
FIG. 23 is a schematic diagram illustrating an example of the functional configuration of a gateway according to the third embodiment.

FIG. 23 is a schematic diagram illustrating the functional configuration of a gateway according to the third embodiment. As illustrated in FIG. 23, the gateway 20c includes multiple interfaces 21 and 28, multiple sending/receiving units 22 and 27, the message identifying unit 23, a roundabout communication specifying unit 24a, a path change notifying unit 25a, a transfer processing unit 26a, and an address association table storing unit 29b. It is assumed that the interfaces 21 and 28, the sending/receiving units 22 and 27, and the message identifying unit 23 have the same functions as those performed by the interfaces 21 and 28, the sending/receiving units 22 and 27, and the message identifying unit 23, respectively, illustrated in FIG. 8; therefore, descriptions thereof will be omitted.

The address association table storing unit 29b stores therein, in an associated manner, the source IP address and the destination IP address in an IP packet in a frame received by the gateway 20c. For example, FIG. 24 is a schematic diagram illustrating an example of an address association table stored in the gateway according to the third embodiment. In the example illustrated in FIG. 24, the address association table storing unit 29b stores therein, in an associated manner, the source IP address "10.0.0.1" and the destination IP address "192.168.0.2".

A description will be given here by referring back to FIG. 23. When the transfer processing unit 26a receives an IP packet from the message identifying unit 23, the transfer processing unit 26a performs, similarly to the transfer processing unit 26, a packet transfer process on the gateway 20c. For example, when the transfer processing unit 26a receives an IP packet from the message identifying unit 23, the transfer processing unit 26a stores, in the address association table storing unit 29b in an associated manner, the source IP address and the destination IP address in the IP packet in the frame.

Then, the transfer processing unit 26a generates an ARP request in which the MAC address of the gateway 20c is stored as the source MAC address and the destination IP address in the IP packet is also stored. Furthermore, the transfer processing unit 26a stores the ARP request in a frame and then outputs the frame to the sending/receiving unit 27. Furthermore, when the transfer processing unit 26a receives a frame in which an ARP response is stored, the transfer processing unit 26a generates a frame in which the source MAC address in the ARP response in the frame is stored as the destination MAC address. Then, the transfer processing unit 26a stores, in the generated frame, the IP packet that was received from the message identifying unit 23 and then outputs the frame in which the IP packet is stored to the sending/receiving unit 27.

When the roundabout communication specifying unit 24a receives a roundabout notification message from the message identifying unit 23, the roundabout communication specifying unit 24a receives a source protocol address from the received roundabout notification message. Furthermore, the roundabout communication specifying unit 24a reads, from the address association table storing unit 29b, the source IP address that is associated with the acquired source protocol address.

Specifically, by using the source protocol address in the ARP response in the received frame, the roundabout communication specifying unit 24a reads, from the address association table storing unit 29b, the source IP address in the IP packet that triggers the issuing of the ARP request. Then, the roundabout communication specifying unit 24a outputs both the read source IP address and the roundabout notification message to the path change notifying unit 25a.

When the path change notifying unit 25a receives, from the roundabout communication specifying unit 24a, the roundabout notification message and the source IP address, the path change notifying unit 25a acquires, by using the received source IP address, the MAC address of the terminal device that is the destination of the roundabout notification message. Then, the path change notifying unit 25a generates a frame in which the acquired MAC address is stored as the destination MAC address and then stores the roundabout notification message in the generated frame. Thereafter, the path change notifying unit 25a outputs the frame in which the roundabout notification message is stored to the sending/receiving unit 22.

FIG. 25 is a schematic diagram illustrating an example of the format of a roundabout notification message according to the third embodiment. As illustrated in FIG. 25, the path change notifying unit 25a generates a roundabout notification message in which the destination IP address of an IP packet and the roundabout flag are stored. When the path change notifying unit 25a receives the IP address "10.0.0.1" of the terminal device 2 from the roundabout communication specifying unit 24a, the path change notifying unit 25a acquires the MAC address of the terminal device 2 by using the received IP address "10.0.0.1".

Then, the path change notifying unit 25a stores the roundabout notification message in a frame in which the acquired MAC address is stored as the destination MAC address and then outputs the frame to the network 3. Consequently, in the example illustrated in FIG. 25, the path change notifying unit 25a can notify the terminal device 2 that the communication path for the IP packet in which the IP address "192.168.0.2" is stored as the destination IP address is a roundabout path.

Figure 26:
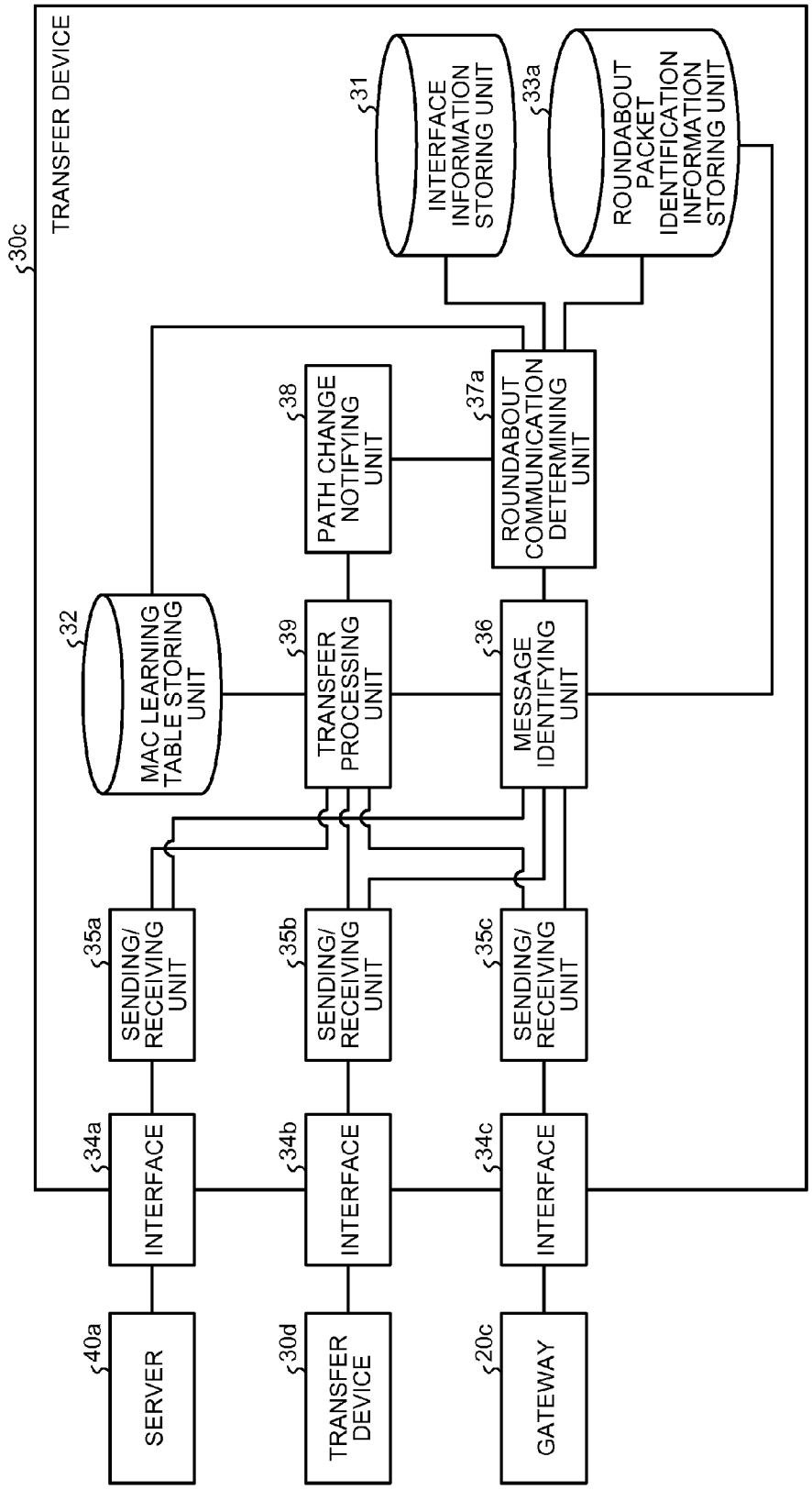
FIG. 26 is a schematic diagram illustrating an example of the functional configuration of a transfer device according to the third embodiment.

In the following, the functional configuration of the transfer device 30c will be described with reference to FIG. 26. FIG. 26 is a schematic diagram illustrating an example of the functional configuration of a transfer device according to the third embodiment. In the example illustrated in FIG. 26, the transfer device 30c includes the interface information storing unit 31, the MAC learning table storing unit 32, and a roundabout packet identification information storing unit 33a. Furthermore, the transfer device 30c includes multiple interfaces 34a to 34c, multiple sending/receiving units 35a to 35c, the message identifying unit 36, a roundabout communication determining unit 37a, the path change notifying unit 38, and the transfer processing unit 39.

It is assumed that each of the interface information storing unit 31 and the MAC learning table storing unit 32 stores the same information as that stored in the first embodiment; therefore, descriptions thereof will be omitted. Furthermore, it is assumed that the interfaces 34a to 34c, the sending/receiving units 35a to 35c, the message identifying unit 36, the path change notifying unit 38, and the transfer processing unit 39 have the same functions as those performed in the first embodiment; therefore, descriptions thereof will be omitted.

For example, the transfer device 30c includes the roundabout packet identification information storing unit 33a and the roundabout communication determining unit 37a. Similarly to the roundabout packet identification information storing unit 33, the roundabout packet identification information storing unit 33a stores therein a rule for determining whether a packet in a frame transferred by the transfer device 30c is a roundabout packet.

FIG. 27 is a schematic diagram illustrating an example of roundabout packet identification information stored in the transfer device according to the third embodiment. In the example illustrated in FIG. 27, the roundabout packet identification information storing unit 33a stores therein, an "ARP response" as the target packet, the "destination MAC address=M2" as the detection rule, "receiving" as the communication direction, and "LAN communication information=Yes" as the communication content. Consequently, when an ARP response is stored in a frame received from a LAN other than the LAN 11a and when the destination MAC address in the ARP response in the frame is "M2", the transfer device 30c determines that the ARP response in the received frame is a roundabout packet.

When the roundabout communication determining unit 37a receives the frame from the message identifying unit 36, the roundabout communication determining unit 37a determines whether the type of packet in the frame is an ARP response. Then, the roundabout communication determining unit 37a determines whether an ARP response is stored in the received frame and determines whether the ARP response in the frame satisfies the detection rule, the communication direction, and the communication content in the roundabout packet identification information. Then, when the ARP response in the received frame satisfies the roundabout packet identification information, the roundabout communication determining unit 37a outputs the ARP response in the received frame to the path change notifying unit 38. In contrast, when the ARP response in the received frame does not satisfy the roundabout packet identification information, the roundabout communication determining unit 37a discards the received ARP response.

An example of a process performed by the roundabout communication determining unit 37a will be described below. In the following, a description will be given of an example in which the roundabout packet identification information storing unit 33a stores therein the roundabout packet identification information illustrated in FIG. 27. For example, because the detection rule in the roundabout packet identification information is "destination MAC address=M2", the roundabout communication determining unit 37a determines whether the destination MAC address in an ARP response in a frame is "M2".

When the destination MAC address in the ARP response in the frame is "M2", because the communication direction in the roundabout packet identification information is "receiving", the roundabout communication determining unit 37a identifies, from the source MAC address, the interface that has received the frame. For example, the roundabout communication determining unit 37a reads, from the MAC learning table storing unit 32, the interface identifier that is associated with the source MAC address of the frame.

Then, the roundabout communication determining unit 37a checks the interface information storing unit 31 and determines whether the LAN communication information that is associated with the interface identifier read from the MAC learning table storing unit 32 is "Yes". Specifically, the roundabout communication determining unit 37a determines whether the interface that has received the frame in which the ARP response is stored is the interface that is connected to a LAN other than the LAN 11a. When the LAN communication information associated with the read interface identifier is "Yes", the roundabout communication determining unit 37a outputs the ARP response that is stored in the read frame to the path change notifying unit 38.

Specifically, when the transfer device 30c receives a frame in which an ARP response is stored from the LAN 11b, the transfer device 30c determines whether the destination MAC address is the MAC address of the gateway 20c. Here, when the destination MAC address in the ARP response in the frame is the MAC address of the gateway 20c, it can be assumed that the gateway 20c has received, from the terminal device 2, the IP packet in which the server 40b in the LAN 11b is stored as the destination.

Consequently, when the transfer device 30c receives a frame in which an ARP response is stored from the LAN 11b, if the destination MAC address is the MAC address of the gateway 20c, the transfer device 30c determines that the ARP response in the received frame is a roundabout packet. Then, the transfer device 30c sends a roundabout notification message to the gateway 20c.

Consequently, by using the source IP address in an IP packet that triggers an ARP response, the gateway 20c sends the roundabout notification message to the terminal device 2. Consequently, even when the transfer device 30c determines a communication path is a roundabout path by using an ARP response, the transfer device 30c can send a roundabout notification message to the terminal device 2.

Figure 28:
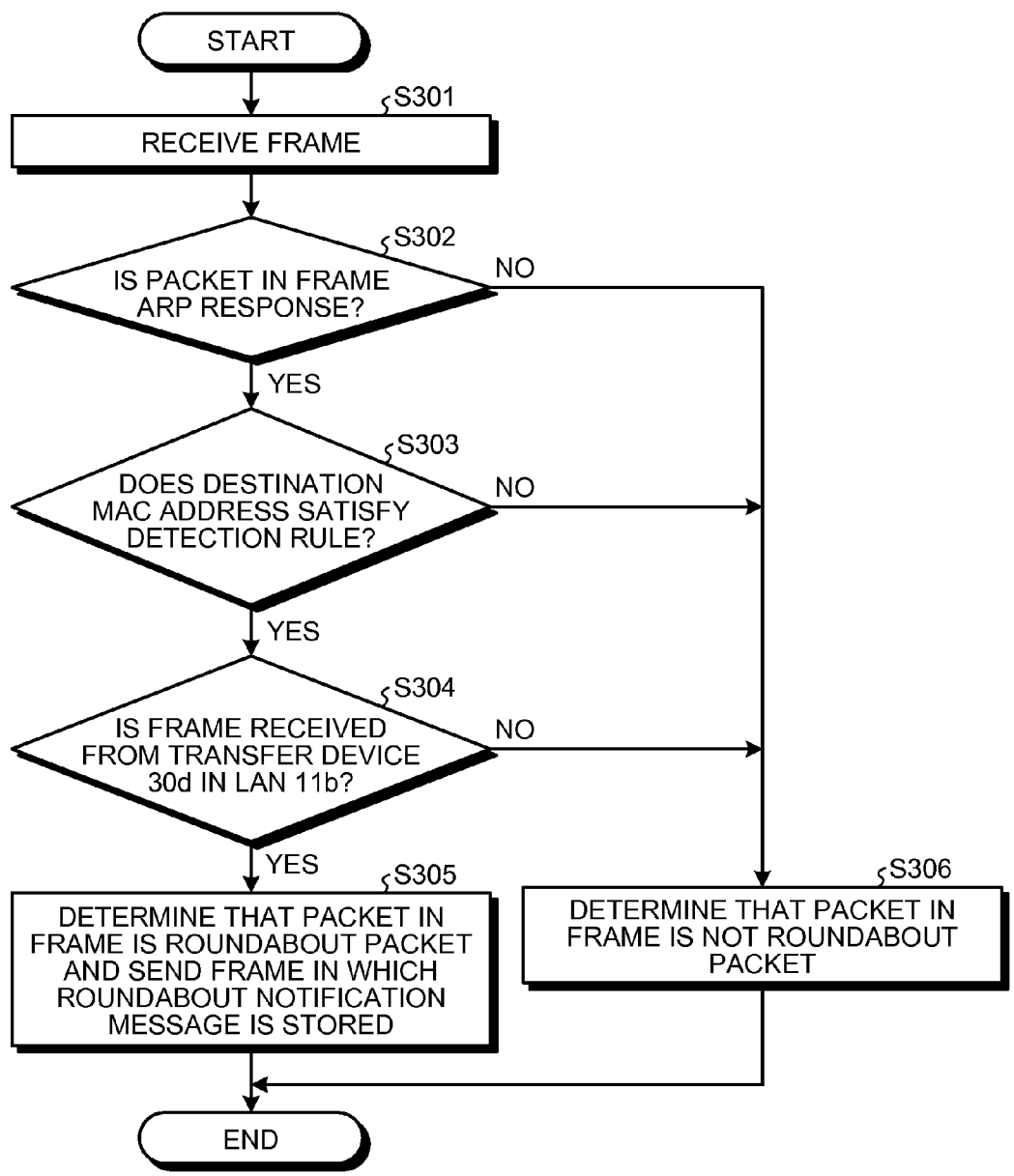
FIG. 28 is a flowchart illustrating the flow of a roundabout packet determining process according to the third embodiment.

In the following, the flow of a process in which the transfer device 30c determines, by using an ARP response in a frame that is received from the transfer device 30d, whether a communication path is a roundabout path will be described with reference to FIG. 28. FIG. 28 is a flowchart illustrating the flow of a roundabout packet determining process according to the third embodiment.

First, when the transfer device 30c receives a frame from one of the gateway 20c, the transfer device 30d, and the server 40a (Step S301), the transfer device 30c determines whether the type of packet in the received frame is an ARP response (Step S302). When the type of packet in the received frame is an ARP response (Yes at Step S302), the transfer device 30c determines whether the destination MAC address in the ARP response in the received frame satisfies the detection rule (Step S303).

Furthermore, when the destination MAC address in the ARP response in the received frame satisfies the detection rule (Yes at Step S303), the transfer device 30c determines whether the transfer device 30c has received the frame from the transfer device 30d in the LAN 11b (Step S304). Specifically, the transfer device 30c determines whether the frame in which the ARP response is stored is received via a link that connects the LAN 11a and the LAN 11b. When the transfer device 30c receives the frame in which the ARP response is stored from the transfer device 30b in the LAN 11b (Yes at Step S304), the transfer device 30c determines that a communication path is a roundabout path, sends a roundabout notification message to the terminal device 2 (Step S305), and then ends the process.

In contrast, when the type of packet in the received frame is not an ARP response (No at Step S302), the transfer device 30c determines that a communication path is not a roundabout path (Step S306) and then ends the process. Furthermore, when the destination MAC address in the ARP response in the received frame does not satisfy the detection rule (No at Step S303), the transfer device 30c determines that a communication path is not a roundabout path (Step S306) and then ends the process. Furthermore, when the transfer device 30c has received the frame from a device other than the transfer device 30d in the LAN 11b (No at Step S304), the transfer device 30c determines that a communication path is not a roundabout path (Step S306) and then ends the process.

[Advantage of the Third Embodiment]

As described above, on the basis of an ARP response in a frame received from the transfer device 30d, the transfer device 30c can determine whether a communication path is a roundabout path. For example, when the destination MAC address in an ARP response in a frame received from the transfer device 30d is a gateway or when the destination MAC address in an ARP response to be sent to the transfer device 30d is a gateway, the transfer device 30c determines that the ARP response in the frame is a roundabout packet.

Consequently, because the transfer device 30c can switch, before an IP packet passes through the roundabout path, the gateway to a gateway to which the terminal device 2 sends a packet, it is possible to reduce the traffic in the subnet 10.

Furthermore, the transfer device 30c sends, to the terminal device 2 via the gateway 20c, a roundabout notification message in which the destination IP address in an IP packet that passes through a roundabout path is stored. Specifically, the transfer device 30c instructs the gateway 20c, to which the destination MAC address in the ARP response in the received frame is allocated, to send the roundabout notification message.

Then, the gateway 20c generates a packet for the roundabout notification message and sends the packet to the terminal device 2 that is the source of the packet communication related to the ARP response. Consequently, when the terminal device 2 performs packet communication with one of the servers 40a and 40b in the subnet 10, the transfer device 30c can send, as a notification, which packet communication is a roundabout path.

Specifically, the gateway 20c stores therein, in an associated manner, the destination IP address and the source IP address in an IP packet. Then, by using the source IP address that is stored in the roundabout notification message and that is associated with the destination IP address that is the same address as that of the source protocol address, the gateway 20c acquires the MAC address of the terminal device that is the source of the IP packet. Then, the gateway 20c stores the roundabout notification message in a frame in which the acquired MAC address is stored in the destination MAC address. Consequently, even when the transfer device 30c detects a roundabout packet by using an ARP response, the gateway 20c can send a roundabout notification message to the source of the IP packet.

Furthermore, when the terminal device 2 receives a roundabout notification message from the gateway 20c, the terminal device 2 switches the gateway that is used when an IP packet is sent to a server that is indicated by the IP address stored in the roundabout notification message. Consequently, even when multiple terminal devices that are the same type as the terminal device 2 access the subnet 10, the transfer device 30c can send a roundabout notification message only to a terminal device that performs packet communication via a roundabout path.

[d] Fourth Embodiment

In a fourth embodiment, a description will be given of a variation of the communication system 1a according to the third embodiment. For example, the gateway 20c sends the roundabout notification message illustrated in FIG. 25; however, the embodiment is not limited thereto. For example, similar to a variation of the transfer device 30a described in the second embodiment, it is possible to send a roundabout notification message that includes the IP address of a gateway that is used after the switching of gateways.

For example, in addition to the interface identifier associated with the LAN communication information, the transfer device 30c stores therein, in an associated manner as interface information, an IP address that is allocated to the gateway in a LAN that includes therein a device at the connection destination. When the transfer device 30c determines that the ARP request in the received frame is a roundabout packet, the transfer device 30c acquires the IP address of the gateway that is associated with the interface identifier of the interface that has received the frame. Then, the transfer device 30c may generate a roundabout notification message in which the acquired IP address is stored and then may send, to the gateway 20c, the frame in which the generated roundabout notification message is stored. Consequently, the transfer device 30c notifies the terminal device 2 of the IP address of a gateway that is used after the switching of gateways.

Furthermore, the gateway 20a may also store the roundabout flag in an ARP cache table. For example, the gateway 20a uses the source MAC address acquired from an ARP response as the destination MAC address and then stores the source protocol address as the destination IP address in the ARP cache table. Furthermore, the gateway 20a stores, in the ARP cache table, the roundabout flag that indicates whether the IP packet in which the associated destination IP address is stored is a roundabout packet. Then, by using the roundabout flag stored in the ARP cache table, the gateway 20a determines whether the packet in the received frame is a roundabout packet.

Figure 29:
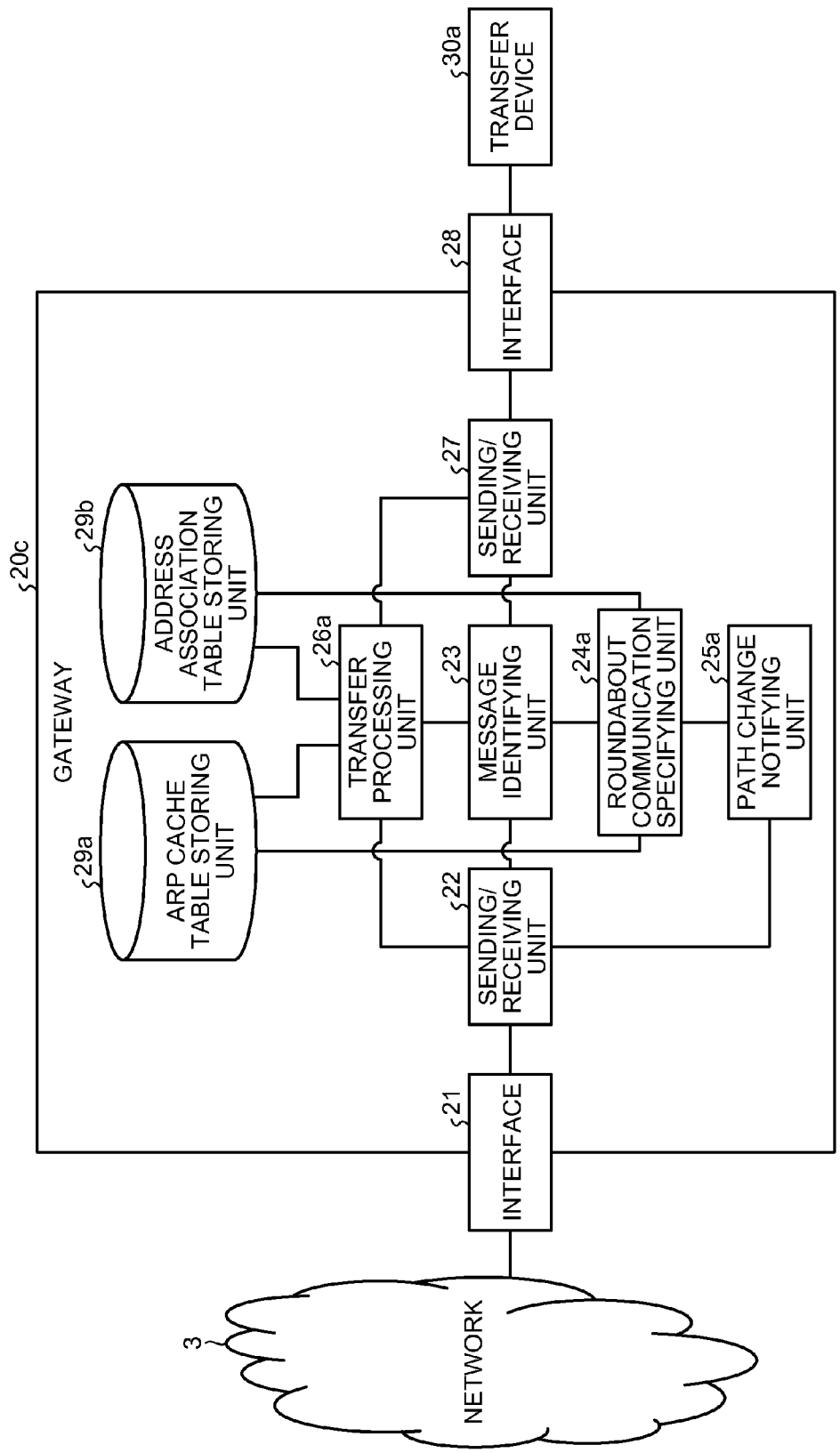
FIG. 29 is a schematic diagram illustrating a variation of the functional configuration of the gateway.

In the following, a description will be given of the gateway 20c that determines whether a packet in the received frame is a roundabout packet by using the ARP cache table. First, a variation of the functional configuration of the gateway 20c will be described with reference to FIG. 29. FIG. 29 is a schematic diagram illustrating a variation of the functional configuration of the gateway. As illustrated in FIG. 29, the gateway 20c includes the ARP cache table storing unit 29a.

FIG. 30 is a schematic diagram illustrating a variation of the ARP cache table stored in the gateway. As illustrated in FIG. 30, the ARP cache table storing unit 29a stores an ARP cache table in which the destination IP address, the MAC address, and the roundabout flag are associated with each other. In the example illustrated in FIG. 30, the ARP cache table storing unit 29a stores therein an ARP cache table in which the destination IP address "192.168.0.2", the MAC address "M1", and the roundabout flag "OFF" are associated with each other.

By using the ARP cache table storing unit 29a described above, the transfer processing unit 26a performs a transfer process on an IP packet. Specifically, the transfer processing unit 26a determines whether the destination IP address in an IP packet in a frame received from the message identifying unit 23 is stored in the ARP cache table.

When the destination IP address in an IP packet in a received frame is not stored in the ARP cache table storing unit 29a, the transfer processing unit 26a issues a frame in which an ARP request is stored. When the transfer processing unit 26a receives a frame in which an ARP response is stored, the transfer processing unit 26a stores, in the ARP cache table storing unit 29a in an associated manner, the source protocol address, the source MAC address, and the roundabout flag "OFF" in the received ARP response.

At this point, in addition to the processes described above, when the roundabout communication specifying unit 24a receives a roundabout notification message, the roundabout communication specifying unit 24a changes the roundabout flag, which is stored in the roundabout notification message and is associated with the destination IP address, to "ON". Then, when the destination IP address in an IP packet in a newly received frame is stored in the ARP cache table storing unit 29a, the transfer processing unit 26a determines whether the roundabout flag that is associated with the destination IP address is "ON".

At this point, when the roundabout flag associated with the destination IP address is "ON", the transfer processing unit 26a sends a roundabout notification message to the source that is stored in the newly received frame. Specifically, the transfer processing unit 26a generates a new frame in which the source MAC address stored in the received frame is stored in the destination MAC address. Furthermore, the transfer processing unit 26a generates a roundabout notification message in which the destination IP address and the roundabout flag "ON" in the IP packet in the received frame is stored. Then, the transfer processing unit 26a stores the generated roundabout notification message in the generated frame and then outputs the frame to the network 3.

[Advantage of the Fourth Embodiment]

As described above, the gateway 20c includes the ARP cache table storing unit 29a that stores therein by associating a combination of the source protocol address and the source MAC address, which are stored in an ARP response, with the roundabout flag. When the gateway 20c receives a roundabout notification message from the transfer device 30c, the gateway 20c sets the roundabout flag associated with the destination IP address in the roundabout notification message to "ON".

When the ARP cache table storing unit 29a stores therein, in an associated manner, the destination IP address and the roundabout flag "ON" in the IP packet in the frame, the gateway 20c sends a roundabout notification message to the source of the frame.

Consequently, every time the gateway 20c receives, from an external device outside the subnet 10, multiple IP packets in each of which the server 40b is stored as the destination, the gateway 20c can determine whether an IP packet is a roundabout packet without issuing an ARP request. Furthermore, when the gateway 20c receives a frame in which a roundabout packet is stored, the gateway 20c can promptly send a roundabout notification message to an external device.

[e] Fifth Embodiment

In a fifth embodiment, a description will be given of a communication system 1b in which a transfer device connects a LAN that has a gateway to a LAN that does not have a gateway.

Figure 31:
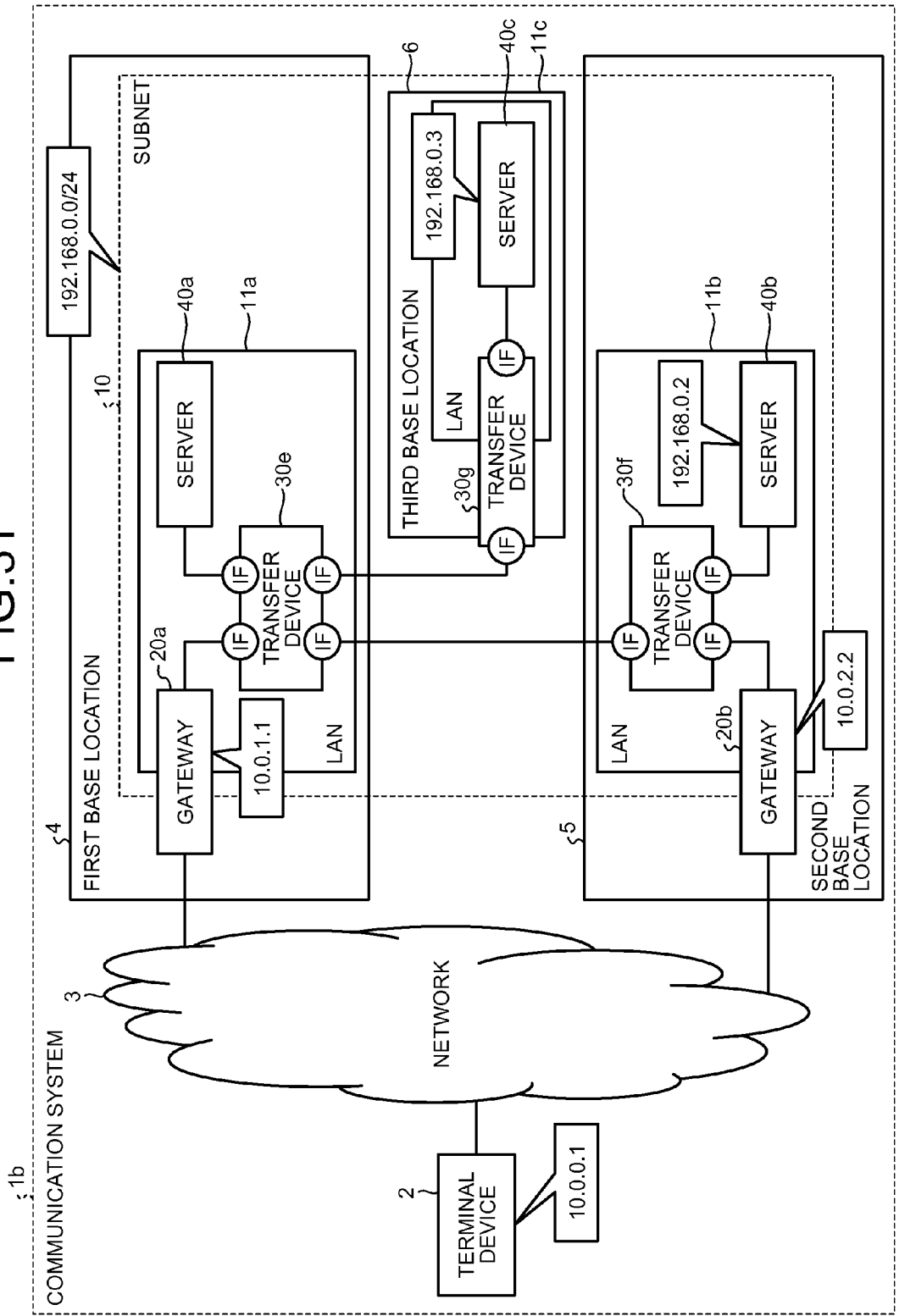
FIG. 31 is a schematic diagram illustrating a communication system according to a fifth embodiment.

FIG. 31 is a schematic diagram illustrating a communication system according to a fifth embodiment. In the example illustrated in FIG. 31, the communication system 1b includes the terminal device 2, the network 3, the first base location 4, the second base location 5, and a third base location 6. The first base location 4 includes the LAN 11a. The second base location 5 includes the LAN 11b. The third base location 6 includes a LAN 11c.

The LAN 11a includes the gateway 20a, a transfer device 30e, and the server 40a. The LAN 11b includes the gateway 20b, a transfer device 30f, and the server 40b. The LAN 11c does not include a gateway but includes a transfer device 30g and a server 40c. Here, the IP address "192.168.0.3" is allocated to the server 40c.

The transfer device 30e is connected to the gateway 20a, the server 40a, the transfer device 30f, and the transfer device 30g. The transfer device 30f is connected to the gateway 20b, the transfer device 30e, and the server 40b. The transfer device 30g is connected to the transfer device 30e and the server 40c. Consequently, the terminal device 2 performs packet communication with the server 40c via the gateway 20a, the transfer device 30e, and the transfer device 30g.

In the following, a description will be given of the function performed by the transfer device 30e included in the communication system 1b. It is assumed that the terminal device 2, the network 3, and the servers 40a and 40b illustrated in FIG. 31 have the same functions as those performed by the terminal device 2, the network 3, and the servers 40a and 40b, respectively, illustrated in FIG. 1; therefore, descriptions thereof will be omitted. Furthermore, it is assumed that the transfer devices 30f and 30g have the same function as that performed by the transfer device 30e; therefore, descriptions thereof will be omitted. Furthermore, it is assumed that the server 40c has the same function as that performed by the server 40a or the server 40b; therefore, descriptions thereof will be omitted.

The transfer device 30e stores, for each interface, whether a LAN that is the connection destination includes a gateway. Furthermore, the transfer device 30e determines whether an interface that outputs a frame in which an IP packet is stored is connected to a LAN other than the LAN 11a, i.e., is connected to the transfer device 30f in the LAN 11b or the transfer device 30g in the LAN 11c.

Furthermore, the transfer device 30e determines whether the LAN that connects an interface that outputs a frame in which an IP packet is stored is a LAN that includes a gateway, i.e., is the LAN 11b. When an interface that outputs a frame is connected to the transfer device 30f in the LAN 11b, the transfer device 30e determines whether the source IP address in an IP packet in the frame is within the range of the network addresses in the subnet 10. Specifically, the transfer device 30e determines whether an IP packet in a frame to be sent is an IP packet related to packet communication between one of the servers 40a to 40c, which is an internal device in the subnet 10, and the terminal device 2, which is an external device outside the subnet 10.

When the transfer device 30e determines that the source IP address in the IP packet in the frame is not within the range of the network addresses in the subnet 10, the transfer device 30e determines that a packet in a frame received by using the packet in the received frame is a roundabout packet. Then, the transfer device 30e notifies, via the gateway 20a, the terminal device 2 of the switching of the gateways.

Specifically, in the example illustrated in FIG. 31, each of the LANs 11a and 11b includes a gateway; however, the LAN 11c does not include a gateway. Consequently, the IP packet in the frame sent by the transfer device 30e to the transfer device 30f becomes a candidate for a roundabout packet; however, the IP packet in the frame to be sent to the transfer device 30g does not become a candidate for a roundabout packet.

Consequently, the transfer device 30e stores, for each interface, information indicating whether a LAN that is the connection destination includes a gateway. When a LAN that is the connection destination of the interface that outputs a frame in which an IP packet is stored includes a gateway, the transfer device 30e determines that the IP packet in which a roundabout packet in a frame to be sent is a candidate. Then, similarly to the transfer device 30a, the transfer device 30e determines whether the IP packet in the frame to be sent satisfies the detection rule. When the IP packet satisfies the detection rule, the transfer device 30e determines that the packet in the frame is a roundabout packet.

In the example illustrated in FIG. 31, because each of the transfer devices 30e and 30f performs the determination of a roundabout packet, it is possible to prevent the packet communication between the terminal device 2 and the server 40c from passing through a roundabout path. Specifically, when the terminal device 2 sends, to the gateway 20b, an IP packet in which the server 40c is stored as the destination, the subnet 10 performs LAN communication for the packet twice. However, when the transfer device 30f notifies the terminal device 2 of a change in the gateways, the terminal device 2 sends a frame that stores therein an IP packet in which the server 40c is stored as the destination to the gateway 20a. Consequently, the transfer devices 30e and 30f can eliminate the roundabout path.

Figure 32:
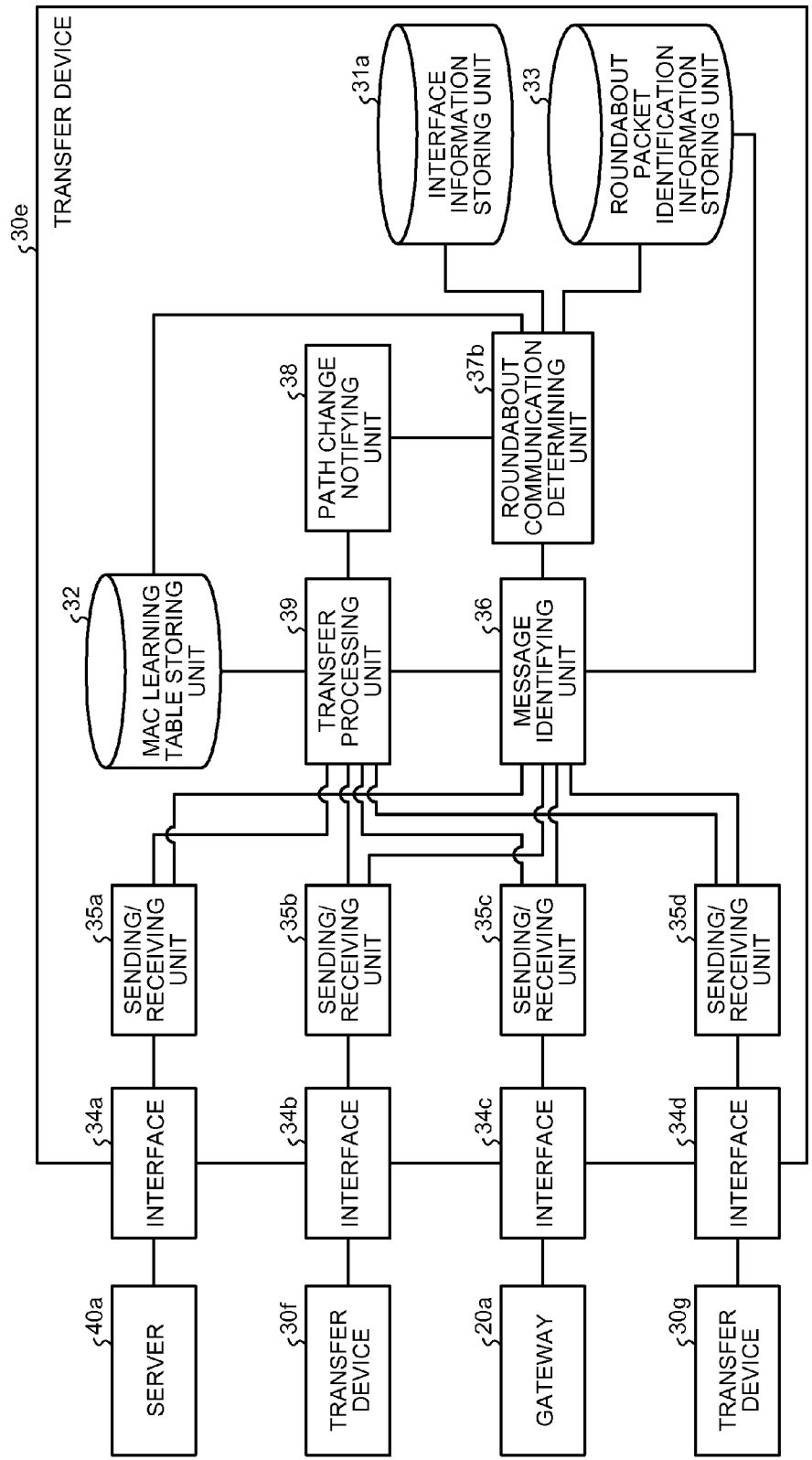
FIG. 32 is a schematic diagram illustrating an example of the functional configuration of a transfer device according to the fifth embodiment.

In the following, the functional configuration of the transfer device 30e will be described with reference to FIG. 32. FIG. 32 is a schematic diagram illustrating an example of the functional configuration of a transfer device according to the fifth embodiment. As illustrated in FIG. 32, the transfer device 30e includes an interface information storing unit 31a, the MAC learning table storing unit 32, and the roundabout packet identification information storing unit 33. The transfer device 30e includes multiple interfaces 34a to 34d, multiple sending/receiving units 35a to 35d, the message identifying unit 36, a roundabout communication determining unit 37b, the path change notifying unit 38, and the transfer processing unit 39. Here, the interface 34d is connected to the transfer device 30g.

It is assumed that, similarly to the first embodiment, the MAC learning table storing unit 32 stores therein the information illustrated in FIG. 13 and it is assumed that, similarly to the first embodiment, the roundabout packet identification information storing unit 33 stores therein the information illustrated in FIG. 14; therefore, descriptions thereof will be omitted. Furthermore, it is assumed that the interfaces 34a to 34d, the sending/receiving units 35a to 35d, the message identifying unit 36, the path change notifying unit 38, and the transfer processing unit 39 have the same functions as those performed in the first embodiment; therefore, descriptions thereof will be omitted.

The interface information storing unit 31a stores therein interface information indicating whether each of the interfaces 34 to 34d is connected to a LAN other than the LAN 11a and indicating whether a gateway is present in a LAN to which the interface is connected, i.e., a LAN at the connection destination.

FIG. 33 is a schematic diagram illustrating an example of interface information according to the fifth embodiment. As illustrated in FIG. 33, the interface information storing unit 31a stores therein, in an associated manner, the interface identifier, LAN communication information, and gateway information on a LAN at the connection destination. For example, the interface information storing unit 31a stores therein the LAN communication information "No" by associating the information with each of the interface identifier "IF #1" that indicates the interface 34a and the interface identifier "IF #3" that indicates the interface 34c. When the LAN communication information is "No", the interface information storing unit 31a does not store therein gateway information on a LAN at the connection destination.

Furthermore, the interface information storing unit 31a stores therein, in an associated manner, the interface identifier "IF #2" that indicates the interface 34b, the LAN communication information "Yes", and the gateway information related to a LAN at the connection destination is "present". Furthermore, the interface information storing unit 31a stores therein, in an associated manner, the interface identifier "IF #4" that indicates the interface 34d, the LAN communication information "Yes", and the gateway information related to a LAN at the connection destination is "not present".

When the roundabout communication determining unit 37b receives a frame from the message identifying unit 36, the roundabout communication determining unit 37b acquires the roundabout packet identification information that is stored in the roundabout packet identification information storing unit 33. Then, the roundabout communication determining unit 37b determines whether the packet in the received frame is a packet that satisfies the detection rule, the communication direction, and the communication content in the roundabout packet identification information.

When the packet in the received frame satisfies the detection rule, the communication direction, and the communication content in the roundabout packet identification information, the roundabout communication determining unit 37b checks the received interface information and then determines whether the destination LAN of the frame includes a gateway. When the destination LAN of the frame includes a gateway, the roundabout communication determining unit 37b outputs the packet in the received frame to the path change notifying unit 38. In contrast, when the destination LAN of the frame does not include a gateway, the roundabout communication determining unit 37b discards the received frame.

An example of a process performed by the roundabout communication determining unit 37b will be described below. In the following, a description will be given of an example in which the interface information storing unit 31a stores therein the interface information illustrated in FIG. 33 and the roundabout packet identification information storing unit 33 stores therein the roundabout packet identification information illustrated in FIG. 14.

For example, when receiving a frame from the message identifying unit 36, the roundabout communication determining unit 37b determines whether the source IP address in the IP packet in the received frame is a value other than "192.168.0.0/24". When the source IP address in the IP packet in the received frame is a value other than "192.168.0.0/24", the communication direction in the roundabout packet identification information is "sending"; therefore, the roundabout communication determining unit 37b identifies the destination MAC address in the received frame. Then, the roundabout communication determining unit 37b reads, from the MAC learning table storing unit 32, the interface identifier of the output interface that is associated with the identified destination MAC address.

Then, the roundabout communication determining unit 37b checks the interface information stored in the interface information storing unit 31a and then determines whether the LAN communication information that is associated with the read interface identifier is "Yes". When the LAN communication information that is associated with the read interface identifier is "Yes", the roundabout communication determining unit 37b determines whether the gateway information related to a LAN at the connection destination, which is associated with the read interface identifier, is "present".

When the gateway information related to a LAN at the connection destination, which is associated with the read interface identifier, is "present", the roundabout communication determining unit 37b determines that the IP packet in the read frame is a roundabout packet. In contrast, when the source IP address in the IP packet in the frame is included in "192.168.0.0/24" or when the LAN communication information on the interface that outputs the frame is "No", the roundabout communication determining unit 37b discards the frame. Furthermore, when the gateway information related to the destination LAN in the frame is "not present", the roundabout communication determining unit 37b discards the frame.

For example, when the destination MAC address in the received frame is "M4", the roundabout communication determining unit 37b reads the received output interface "IF #2" from the MAC learning table storing unit 32. At this point, for the output interface "IF #2", because the LAN communication information is "Yes" and the gateway information is "present", the roundabout communication determining unit 37b determines that the IP packet in the frame is a roundabout packet.

In contrast, when the destination MAC address in the received frame is "M5", the roundabout communication determining unit 37b determines that the LAN communication information on the received output interface "IF #4" is "Yes". However, because the gateway information on the output interface "IF #4" is "not present", the roundabout communication determining unit 37b determines that the IP packet in the frame is not a roundabout packet.

Specifically, on the basis of the source IP address in an IP packet in a frame, the transfer device 30e determines whether the IP packet in the frame is an IP packet related to packet communication between an internal device in the subnet 10 and the terminal device 2. Furthermore, when an IP packet in a frame that is to be sent is an IP packet related to packet communication between an internal device in the subnet 10 and the terminal device 2, the transfer device 30e determines whether the destination of the frame is a LAN other than the LAN 11a.

Furthermore, when the destination of a frame is a LAN other than the LAN 11a, the transfer device 30e determines whether a LAN that is the destination of the frame includes a gateway. When the LAN that is the destination of the frame includes a gateway, the transfer device 30e determines that the IP packet in the frame to be sent is a roundabout packet.

Consequently, the transfer device 30e can determine whether a packet in a received frame is a roundabout packet without managing the installation location of each of the servers 40a to 40c included in the subnet 10. Furthermore, the transfer device 30e determines whether a LAN that is the destination of an IP packet includes a gateway. Consequently, the transfer device 30e can eliminate a roundabout path even when a LAN that includes a gateway and a LAN that does not include a gateway are present in a mixed manner in the subnet 10.

Figure 34:
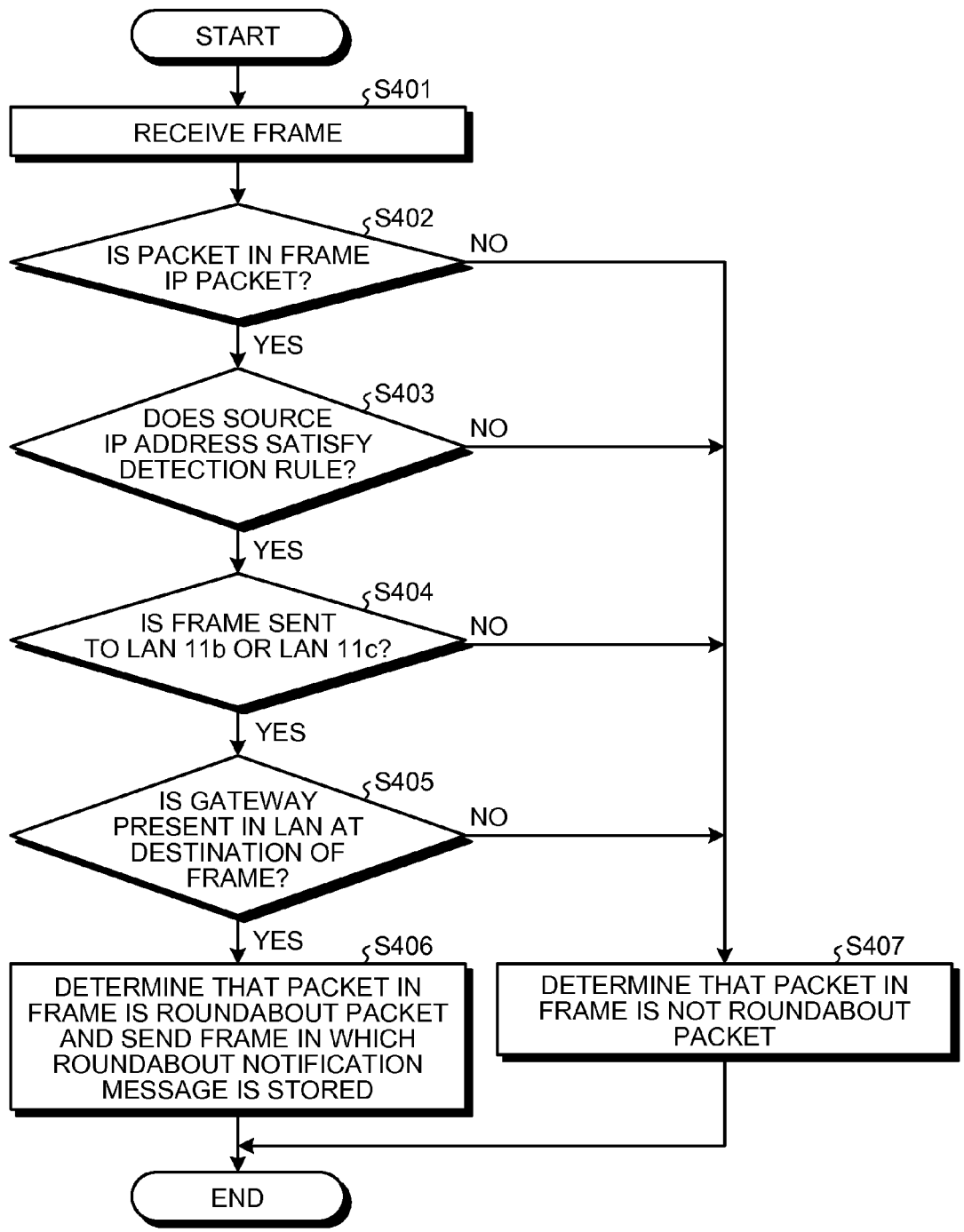
FIG. 34 is a flowchart illustrating the flow of a determining process performed on a roundabout packet according to the fifth embodiment.

In the following, the flow of a process in which the transfer device 30e determines whether a packet in a frame to be sent to the transfer device 30f is a roundabout packet will be described with reference to FIG. 34. FIG. 34 is a flowchart illustrating the flow of a determining process performed on a roundabout packet according to the fifth embodiment.

First, when the transfer device 30e receives a frame from one of the gateway 20a, the transfer device 30f, and the server 40a (Step S401), the transfer device 30e determines whether the type of packet in the received frame is an IP packet (Step S402). When the type of packet in the received frame is an IP packet (Yes at Step S402), the transfer device 30e determines whether the source IP address in the IP packet in the received frame satisfies the detection rule (Step S403).

When the source IP address in the IP packet in the received frame satisfies the detection rule (Yes at Step S403), the transfer device 30e determines whether the received frame is to be sent to the LAN 11b or the LAN 11c (Step S404). When the transfer device 30e sends the received frame to the LAN 11b or the LAN 11c (Yes at Step S404), the transfer device 30e determines whether the LAN that is the destination of the frame includes a gateway (Step S405). Thereafter, when the LAN that is the destination of the frame includes a gateway (Yes at Step S405), the transfer device 30e determines that the packet in the received frame is a roundabout packet, sends a roundabout notification message to the terminal device 2 (Step S406), and then ends the process.

In contrast, when the type of packet in the received frame is not an IP packet (No at Step S402), the transfer device 30e determines that packet in the received frame is not a roundabout packet (Step S407) and then ends the process. Furthermore, when the source IP address in the IP packet in the received frame does not satisfy the detection rule (No at Step S403), the transfer device 30e determines that the IP packet in the received frame is not a roundabout packet (Step S407) and then ends the process. Furthermore, when the transfer device 30e does not send the received frame to the LAN 11b nor the LAN 11c (No at Step S404), the transfer device 30e determines that the packet in the received frame is not a roundabout packet (Step S407) and then ends the process. Furthermore, when the destination LAN in the received frame does not include a gateway (No at Step S405), the transfer device 30e determines that the IP packet in the received frame is not a roundabout packet (Step S407) and then ends the process.

[Advantage of the Fifth Embodiment]

As described above, the transfer device 30e transfers, with the multiple transfer devices 30f and 30g, a frame in which a packet is stored. Furthermore, the transfer device 30e stores therein information indicating whether each interface is connected to a LAN other than the LAN 11a and information indicating whether a LAN at the connection destination includes a gateway. When the transfer device 30e sends a frame to a LAN other than the LAN 11a, the transfer device 30e determines whether the LAN that is the destination of the frame includes a gateway. Thereafter, when the transfer device 30e determines that the LAN that is the destination of the frame does not include a gateway, the transfer device 30e determines that the packet in the frame is not a roundabout packet.

Specifically, for the packet in the frame destined for the LAN 11c that is not directly connected to the network 3, the transfer device 30e determines that the packet is not a roundabout packet even when the packet is transferred across the LAN. Consequently, the transfer device 30e can eliminate a roundabout path even when a LAN that includes a gateway and a LAN that does not includes a gateway are present in a mixed manner in the subnet 10.

[f] Sixth Embodiment

In a sixth embodiment, a description will be given of a variation of the communication system 1b according to the fifth embodiment. For example, the transfer device 30e identifies a roundabout path by using an IP packet in a frame to be sent to the transfer device 30f; however, the embodiment is not limited thereto. For example, the transfer device 30f may also determine a roundabout path by using an IP packet in a frame received from the transfer device 30e.

In the following, a description will be given of a process in which the transfer device 30f performs a determination on a roundabout path by using an IP packet in a frame received from the transfer device 30e. For example, FIG. 35 is a schematic diagram illustrating a variation of interface information according to the sixth embodiment. The transfer device 30f stores therein, in an associated manner as interface information, the interface identifier, the LAN communication information, and the gateway IP address of a LAN at the connection destination.

At this point, the interface identifier "IF #4" is the identifier indicating the interface connected to the gateway 20b and the interface identifier "IF #5" is an identifier that indicates the interface connected to the transfer device 30e. Furthermore, the interface identifier "IF #6" is the identifier indicating the interface that is connected to the server 40b. Consequently, the transfer device 30f stores therein, in an associated manner, the interface identifier "IF #4", "IF #6", and LAN communication information "NO". Furthermore, the transfer device 30f stores therein, in an associated manner, the interface identifier "IF #5", the LAN communication information "YES", and the gateway IP address "10.0.1.1" of the LAN at the connection destination.

FIG. 36 is a schematic diagram illustrating a variation of roundabout packet identification information according to the sixth embodiment. For example, the transfer device 30f stores therein the roundabout packet identification information illustrated in FIG. 36. Specifically, the transfer device 30f stores therein roundabout packet identification information in which the target packet of "IP packet", the detection rule of "source IP address≠192.168.0.0/24", the communication direction "receiving", and the communication content "LAN communication information=Yes" are associated with each other.

In the following, a description will be given of a process for determining whether a packet in a received frame is a roundabout packet. For example, when the transfer device 30*f* receives a frame from one of the gateway 20*b*, a server 40*f*, and the transfer device 30*e*, because the target packet in the roundabout packet identification information is an "IP packet", the transfer device 30*f* determines whether the packet in the received frame is an IP packet. Furthermore, when a packet in a received frame is an IP packet, the transfer device 30*f* determines whether the source IP address in the IP packet in the received frame satisfies the detection rule in the roundabout packet identification information.

Specifically, because the detection rule in the roundabout packet identification information is "source IP address≠192.168.0.0/24", the transfer device 30*f* determines whether the source IP address in the IP packet in the frame is a value other than "192.168.0.0/24". When the source IP address in the IP packet in the frame is a value other than "192.168.0.0/24", the transfer device 30*f* determines whether the LAN communication information on the interface that received the frame is "Yes".

When the determination result indicates that the LAN communication information on the interface that received the frame is "Yes", the transfer device 30*f* determines that the IP packet in the received frame is a roundabout packet. For example, when the interface identifier of the interface that received the frame is "IF #5", because the LAN communication information in the interface information is "Yes", the transfer device 30*f* determines that the IP packet in the received frame is a roundabout packet.

Furthermore, when the IP packet in the received frame is a roundabout packet, the transfer device 30*f* acquires an IP address of a gateway that is associated with the interface identifier of the interface that has received the frame. For example, when the interface identifier of the interface that has received the frame is "IF #5", the transfer device 30*f* acquires the IP address "10.0.1.1" of the gateway 20*a*. Then, the transfer device 30*f* sends a roundabout notification message that includes the acquired IP address.

As described above, when the transfer device 30*f* detects a roundabout packet by using the source IP address in an IP packet in a received frame, a setting is set such that the transfer device 30*g* does not detect a roundabout packet. In contrast, similarly to the transfer device 30*f*, the transfer device 30*e* may detect a roundabout packet by using the source IP address in an IP packet in a received frame.

Figure 37:
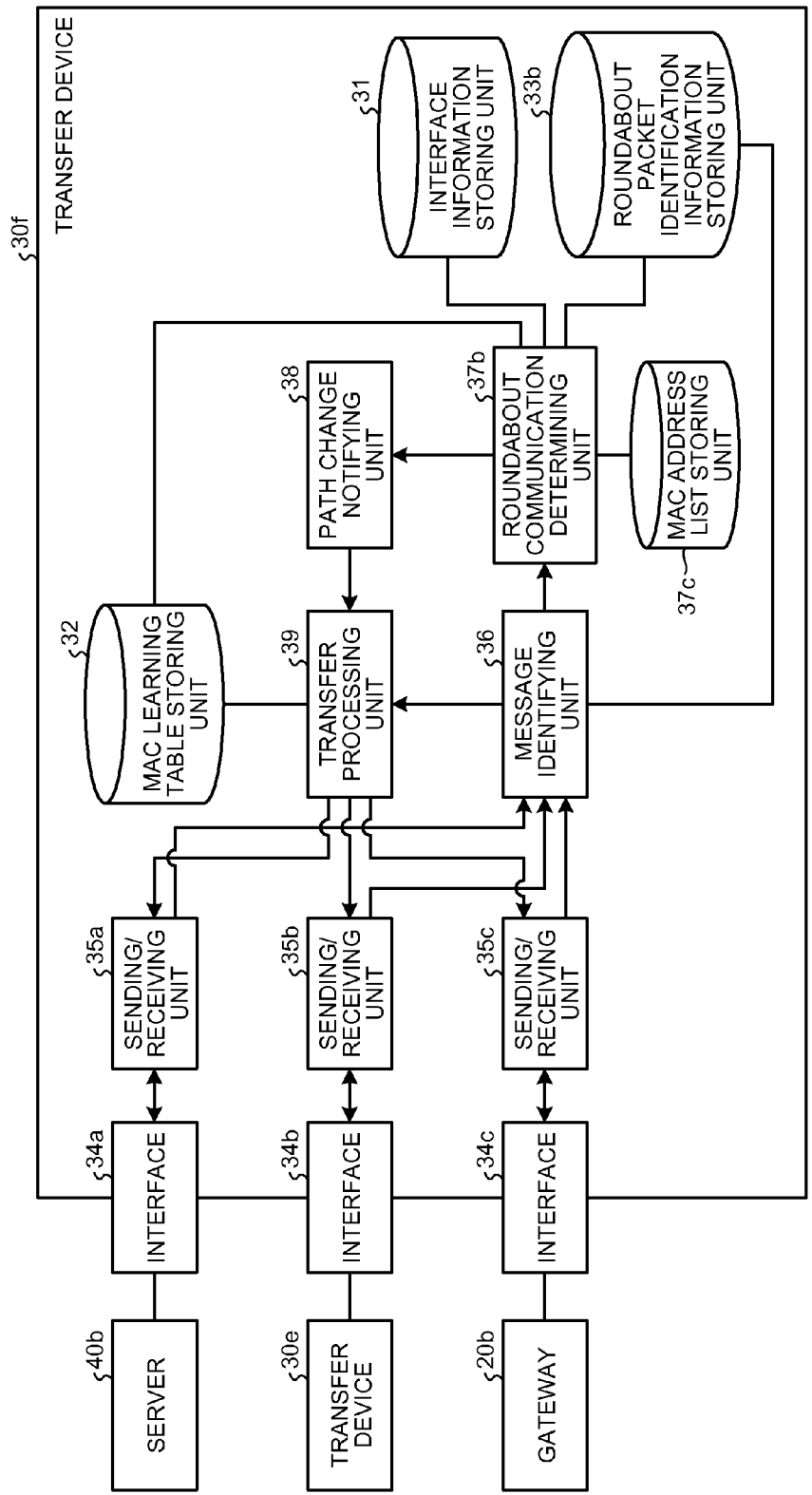
FIG. 37 is a schematic diagram illustrating a variation of the functional configuration of a transfer device according to the sixth embodiment.

Furthermore, similarly to the transfer device 30*c*, the transfer device 30*f* may detect a roundabout packet by using an ARP response in a frame. For example, FIG. 37 is a schematic diagram illustrating a variation of the functional configuration of a transfer device according to the sixth embodiment. As illustrated in FIG. 37, the transfer device 30*f* includes the interface information storing unit 31, the MAC learning table storing unit 32, and a roundabout packet identification information storing unit 33*b*.

The transfer device 30*f* includes the multiple interfaces 34*a* to 34*c*, the multiple sending/receiving units 35*a* to 35*c*, the message identifying unit 36, the roundabout communication determining unit 37*b*, a MAC address list storing unit 37*c*, the path change notifying unit 38, and the transfer processing unit 39. It is assumed that the interface information storing unit 31 and the MAC learning table storing unit 32 store therein the same information as that described in the first embodiment; therefore, descriptions thereof will be omitted. Furthermore, it is assumed that each of the interfaces 34*a* to 34*c*, each of the sending/receiving units 35*a* to 35*c*, the message identifying unit 36, the path change notifying unit 38, and the transfer processing unit 39 perform the same functions as those in the first embodiment; therefore, descriptions thereof will be omitted.

Figures 38, 39:
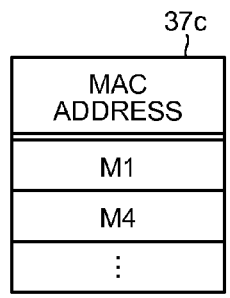
FIG. 38 is a schematic diagram illustrating an example of a MAC address list of a gateway.
FIG. 39 is a schematic diagram illustrating a variation of the roundabout packet identification information used when determination is performed on a roundabout packet by using an ARP response.

The MAC address list storing unit 37*c* stores therein MAC addresses of all of the gateways included in the subnet 10. For example, FIG. 38 is a schematic diagram illustrating an example of a MAC address list of a gateway. As illustrated in FIG. 38, the MAC address list storing unit 37*c* stores therein a MAC address list in which the MAC address "M1" of the gateway 20*a* and the MAC address "M4" of the gateway 20*b* are stored.

A description will be given here by referring back to FIG. 37. The roundabout packet identification information storing unit 33*b* stores therein roundabout packet identification information that is a rule for determining whether a packet sent/received by the transfer device 30*f* is a roundabout packet. For example, FIG. 39 is a schematic diagram illustrating a variation of the roundabout packet identification information used when a determination is performed on a roundabout packet by using an ARP response.

In the example illustrated in FIG. 39, the roundabout packet identification information storing unit 33*b* stores therein an "ARP response" as the target packet, a "destination MAC address=MAC address list" as the detection rule, "sending" as the communication direction, and "LAN communication information=Yes" as the communication content. Consequently, when an ARP response that matches one of the destination MAC addresses in the MAC address list is stored in a frame that is sent to a LAN other than the LAN 10*b*, the transfer device 30*f* determines that the ARP response in the frame is a roundabout packet.

In the following, a description will be given of an example of a process performed by the roundabout communication determining unit 37*b*. For example, because the target packet in the roundabout packet identification information is an "ARP response", the roundabout communication determining unit 37*b* determines whether a packet in a received frame is an ARP response. Here, the detection rule in the roundabout packet identification information is "destination MAC address=MAC address list". Consequently, when the packet in the received frame is an ARP response, the roundabout communication determining unit 37*b* determines whether the destination MAC address in the ARP response in the received frame matches one of the MAC addresses in the MAC address list.

Furthermore, because the communication direction in the roundabout packet identification information indicates "sending", the roundabout communication determining unit 37*b* identifies an interface that sends a frame from the destination MAC address. Then, the roundabout communication determining unit 37*b* checks the interface information and then determines whether the LAN communication information that is associated with the interface identifier of the identified interface indicates "Yes".

When the LAN communication information that is associated with the interface identifier of the identified interface indicates "Yes", the roundabout communication determining unit 37*b* determines that the ARP response in the frame is a roundabout packet. Then, the roundabout communication determining unit 37*b* sends a roundabout notification message to the gateway indicated by the destination MAC address in the ARP response in the frame.

[Advantage of the Sixth Embodiment]

As described above, the transfer device 30f stores therein information that indicates whether each of the interfaces is connected to a LAN other than the LAN 11a and stores therein the MAC addresses of the gateways 20a and 20b in the subnet 10. When the destination MAC address in an ARP response in a frame to be sent to the LAN 11a matches the MAC address of one of the gateway 20a and the gateway 20b, the transfer device 30f determines that the communication path for packet communication is a roundabout path.

Consequently, before an IP packet passes through the roundabout path in the subnet 10, the transfer device 30f can send a notification that the gateway is to be switched. Furthermore, the communication system 1b sets a transfer device in a LAN that includes a gateway, e.g., the transfer device 30e, such that the transfer device performs the same function as that performed by the transfer device 30f. Furthermore, the communication system 1b sets a transfer device in a LAN that does not include a gateway such that the transfer device does not perform a determination on a roundabout packet. Consequently, even when a LAN that includes a gateway and a LAN that does not include a gateway are present in a mixed manner in the subnet 10, the communication system 1b can prevent packet communication from being performed via a roundabout path.

[g] Seventh Embodiment

In the above explanation, a description has been given of the embodiments according to the present invention; however, the embodiments are not limited thereto and can be implemented as various kinds of embodiments other than the embodiment described above. Therefore, another embodiment will be described as a seventh embodiment below.

(1) Communication System

In the communication systems 1 and 1a, the transfer devices 30a to 30d connect the first base location 4 and the second base location 5; however, the embodiments are not limited thereto. For example, the communication systems 1 and 1a may also connects three or more base locations. Furthermore, the communication systems 1 and 1a may also connect three or more base locations in stages or in a cascaded manner. Furthermore, the first base location 4 and the second base location 5 may also include two or more LANs and each of the LANs may be connected by a transfer device. Specifically, the communication systems 1, 1a, and 1b may also include the subnet 10 in which an arbitrary numbers of LANs are connected.

Furthermore, the terminal device 2 is not limited to an information processing apparatus that receives various services. For example, the terminal device 2 may also be an access gateway that is installed in a network that is different from the network 3 or from the subnet 10. Furthermore, the topology of each of the LANs 11a to 11c indicated in one of the communication systems 1, 1a, and 1b is not limited to the embodiments. For example, a ring shaped or a fully connected mesh topology may also be used.

(2) Processes Performed by Each Transfer Device

For example, the transfer device 30a and the transfer device 30b can simultaneously perform a process for detecting a roundabout packet by using the same roundabout packet identification information. Furthermore, the transfer device 30a and the transfer device 30b may also use different roundabout packet identification information. Furthermore, the settings of the roundabout packet identification information are not limited to the example described above.

For example, each of the transfer devices 30a to 30g may also use arbitrary roundabout packet identification information in which the topology of the LANs in the subnet 10, the presence/absence of a gateway, the type of packet used to detect a roundabout packet, or the like are used as a parameter. For example, each of the transfer devices 30a to 30g may also perform a determination on a roundabout packet on the basis of one of the destination IP address, the destination MAC address, the source IP address and the destination IP address in a packet stored in a frame to be transferred.

Furthermore, the roundabout packet identification information stored by the transfer devices 30a to 30g described above is not limited thereto. Specifically, when a packet in a frame that is sent/received to/from LANs that each include a gateway is a packet related to packet communication between an internal device in the subnet 10 and an external device outside the subnet 10, each of the transfer devices 30a to 30g may also determine that packet communication is performed via a roundabout path.

(3) Functional Configuration

Of the processes described in the embodiments, all or a part of the processes that are mentioned as being automatically performed can be manually performed, or all or a part of the processes that are mentioned as being manually performed can be automatically performed using known methods. Furthermore, the flow of the processes, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

(4) Program

The various processes described in the above embodiments may also be implemented by a program prepared in advance and executed by a computer, such as a personal computer or a workstation. Accordingly, in the following, an example of a computer that executes a determining program having the same function as that performed by the transfer device 30a will be described, as an example, with reference to FIG. 40.

Figure 40:
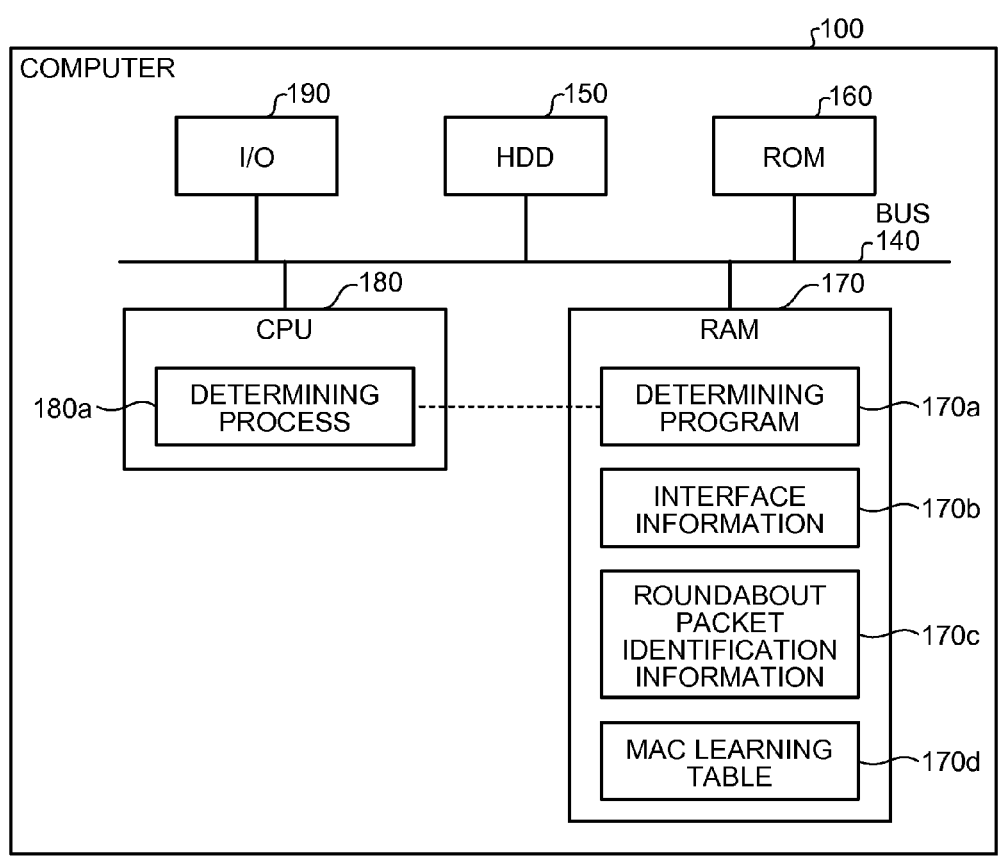
FIG. 40 is a schematic diagram illustrating an example of a computer that executes a determining program.

FIG. 40 is a schematic diagram illustrating an example of a computer that executes a determining program. As illustrated in FIG. 40, a computer 100 includes a hard disk drive (HDD) 150, a read only memory (ROM) 160, a random access memory (RAM) 170, a central processing unit (CPU) 180, and an input/output (I/O) 190. These units 150 to 190 are connected with each other via a bus 140. The computer 100 is, for example, a microprocessor included in a transfer device, such as an L3 switch.

The RAM 170 stores therein, in advance, a determining program 170a, an interface information 170b, a roundabout packet identification information 170c, and a MAC learning table 170d that allows the CPU 180 to perform the function performed by the transfer device 30a. Similarly to the components described in the first embodiment, the determining program 170a may also be integrated or separated.

Then, the CPU 180 reads and loads the determining program 170a to execute the program, thereby the determining program 170a functions as a determining process 180a. This determining process 180a performs various processes on the basis of the interface information 170b, the roundabout packet identification information 170c, and the MAC learning table 170d, which are read from the RAM 170.

Furthermore, the CPU 180 that executed the determining process 180a executes the same processes as those performed by the message identifying unit 36, the roundabout communication determining unit 37, the path change notifying unit 38, and the transfer processing unit 39. Furthermore, for processes virtually implemented in the CPU 180, not all of the processing units need to be always operating in the CPU 180 as long as only the processing unit that need to be operating are virtually implemented.

Furthermore, the determining program 170a described above does not need to be initially stored in the RAM 170. For example, the program is stored in a "portable physical medium", such as a flexible disk (FD), a compact disk (CD)-ROM, a digital video disk (DVD), a magneto-optic disk, an IC card, or the like, that is to be inserted into the computer 100.

Then, the computer 100 may acquire and execute the program from the portable physical medium. Furthermore, the computer 100 may acquire the program stored in another computer or a server device via a public circuit, the Internet, a LAN, a wide area network (WAN), or the like and then execute the program.

In addition to the determining program 170a, the computer 100 illustrated in FIG. 40 can execute a determining program that has the same function as that performed, for example, by the transfer devices 30a to 30g.

According to an aspect of an embodiment, an advantage is provided in that it is possible to shorten a communication path used for roundabout packet communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transfer device that is installed in a first unit network which has a gateway and is included in a plurality of unit networks that form a subnet, the transfer device comprising:
   a sending/receiving unit that sends/receives a frame to/from another transfer device that is installed in a second unit network in the subnet;
   a determining unit that determines, based on destination address or source address in a packet in the frame sent/received by the sending/receiving unit, whether the packet is transferred between an internal device that is installed in the subnet and an external device that is installed outside the subnet; and
   a notifying unit that notifies, when the determining unit determines that the packet is transferred between the internal device and the external device, the external device of an instruction to switch a gateway.

2. The transfer device according to claim 1, wherein, when a source IP address in an Internet Protocol (IP) packet in a frame that is sent by the sending/receiving unit, a destination IP address in an IP packet in a frame that is received by the sending/receiving unit, or a source IP address in an IP packet in a frame received by the sending/receiving unit is an address other than network addresses allocated to the subnet, the determining unit determines that the IP packet is transferred between the internal device and the external device.

3. The transfer device according to claim 2, wherein, when the determining unit determines that the IP packet is transferred between the internal device and the external device, the notifying unit notifies the external device indicated by the source IP address or the destination IP address in the IP packet of the instruction to switch the gateway.

4. The transfer device according to claim 2, wherein the notifying unit notifies the external device of the instruction to switch the gateway that is used when the IP packet is sent to the internal device indicated by the destination IP address or the source IP address in the IP packet.

5. The transfer device according to claim 1, wherein, when a destination Media Access Control (MAC) address in an address resolution protocol (ARP) response in the frame received by the sending/receiving unit is a MAC address of the gateway that is installed in the first unit network, the determining unit determines that the ARP response is transferred between the internal device and the external device.

6. The transfer device according to claim 1, further comprising a MAC address storing unit that stores therein a MAC address of the gateway installed in the first network, wherein, when a destination MAC address in an ARP response in the frame sent by the sending/receiving unit matches the MAC address stored in the MAC address storing unit, the determining unit determines that the ARP response is transferred between the internal device and the external device.

7. The transfer device according to claim 5, wherein, when the determining unit determines that the ARP response is transferred between the internal device and the external device, the notifying unit instructs a gateway to which the destination MAC address in the ARP response is allocated to send the instruction to the external device.

8. The transfer device according to claim 5, wherein the notifying unit notifies the external device of the instruction to switch a gateway that is used when an IP packet is sent to the internal device indicated by an IP address that indicates a source of the ARP response.

9. The transfer device according to claim 1, further comprising:
   one or more of the sending/receiving units; and
   a gateway information storing unit that stores therein, in an associated manner, gateway information indicating whether a gateway is installed in the second unit network and an identifier of the sending/receiving unit sending/receiving a frame to/from the other transfer device in the second unit network, wherein
   the determining unit determines whether the packet in the frame is transferred between the internal device and the external device and determines whether the gateway information storing unit stores therein, in an associated manner, an identifier of a sending/receiving unit sending/receiving the packet and gateway information indicating that the gateway is installed, and
   when the determining unit determines that the packet is transferred between the internal device and the external device and that the gateway information storing unit stores therein, in an associated manner, the identifier of the sending/receiving unit sending/receiving the packet and the gateway information indicating that the gateway is installed, the notifying unit notifies the external device of the instruction to switch the gateway.

10. The transfer device according to claim 1, further comprising:
   one or more of the sending/receiving units; and
   an address storing unit that stores therein, in an associated manner, an IP address of a gateway that is installed in the second unit network and an identifier of the sending/receiving unit sending/receiving a frame to/from the other transfer device in the second unit network, wherein
   the determining unit determines, based on the destination address or the source address in the packet in the frame sent/received by the sending/receiving unit, whether the packet is transferred between the internal device and the external device and whether the packet passes through the gateway that is installed in the first unit network, and when the determining unit determines that the packet is transferred between the internal device and the external device and that the packet passes through the gateway that is installed in the first unit network, the notifying unit acquires an IP address of a gateway that is stored in association with the identifier of the sending/receiving unit sending/receiving the packet in the address storing unit, and notifies the external device of the acquired IP address and the instruction to switch the gateway.

11. The transfer device according to claim 1, wherein
the determining unit determines, based on the destination address or the source address in the packet in the frame sent/received by the sending/receiving unit, whether the packet transferred between the internal device and the external device and whether the packet passes through the gateway that is installed in the first unit network, and when the determining unit determines that the packet is transferred between the internal device and the external device and that the packet passes through the gateway that is installed in the first unit network, and when the gateway that is installed in the second unit network and that is the destination of the packet does not fail, the notifying unit notifies the external device of the instruction to switch the gateway.

12. A communication system comprising:
a gateway that relays a frame transferred between an internal device that is installed in a subnet that includes a plurality of unit networks and an external device that is installed outside the subnet; and
a transfer device that is installed in a first unit network in which the gateway is installed, wherein
the transfer device includes
a sending/receiving unit that sends/receives the frame to/from another transfer device that is installed in a second unit network in the subnet,
a determining unit that determines, based on destination address or source address in a packet in the frame sent/received by the sending/receiving unit, whether the packet is transferred between the internal device and the external device, and
a notifying unit that notifies, when the determining unit determines that the packet is transferred between the internal device and the external device, the gateway that a transfer path for the packet is a roundabout path, and
the gateway includes
a switch instructing unit that instructs, when a notification that the transfer path for the packet is a roundabout path is received from the notifying unit, the transfer device or the other transfer device that is a source of the packet to switch a gateway.

13. The communication system according to claim 12, wherein
the gateway further includes
a storing unit that stores therein, in an associated manner, a destination IP address and a source IP address in an Internet Protocol (IP) packet received from the external device, and
a request sending unit that sends an Address Resolution Protocol (ARP) request in which the destination IP address in the IP packet received from the external device is a target address,
when a destination Media Access Control (MAC) address in an ARP response in the frame received by the sending/receiving unit is a MAC address of the gateway that is installed in the first unit network, the determining unit determines that the ARP response is transferred between the internal device and the external device, when the determining unit determines that the ARP response is transferred between the internal device and the external device, the notifying unit notifies the gateway of the source protocol address stored in the ARP response and notifies the gateway that the transfer path for the packet is a roundabout path, and when a notification of the source protocol address and that the transfer path for the packet is a roundabout path is received from the notifying unit, the switch instructing unit instructs the external device indicated by a source IP address that is associated with the destination address that matches the source protocol address to switch the gateway.

14. The communication system according to claim 13, wherein
the gateway further includes
a roundabout information storing unit that stores therein, in an associated manner, an IP address of the internal device that is the source of the ARP response, a MAC address of the internal device, and roundabout information indicating whether the transfer path for the packet to be sent from the gateway to the internal device is a roundabout path,
an updating unit that updates, when the notification that the transfer path for the packet is a roundabout path is received from the notifying unit, the roundabout information stored in association with the destination IP address of the packet in the roundabout information storing unit, to roundabout information indicating that the transfer path is a roundabout path, and
a judging unit that judges, when the IP packet is received from the external device, whether the roundabout information storing unit stores therein, in an associated manner, the destination IP address in the IP packet and the roundabout information indicating that the transfer path is a roundabout path, and
when the judging unit judges that the roundabout information storing unit stores therein, in an associated manner, the destination IP address in the IP packet and the roundabout information indicating that the transfer path is a roundabout path, the switch instructing unit instructs the external device that is the source of the IP packet to switch the gateway.

15. A roundabout path detecting method performed by a transfer device that is installed in a first unit network which has a gateway and is included in a plurality of unit networks that form a subnet, the roundabout path detecting method comprising:
sending/receiving a frame to/from another transfer device that is installed in a second unit network in the subnet;
determining, based on destination address or source address in a packet in the frame, whether the packet is transferred between an internal device that is installed in the subnet and an external device that is installed outside the subnet; and
notifying, when it is determined at the determining that the packet is transferred between the internal device and the external device, the external device of an instruction to switch a gateway.

16. The roundabout path detecting method according to claim 15, wherein, when a source IP address in an Internet Protocol (IP) packet in a frame to be sent, a destination IP address in an IP packet in a received frame, or a source IP address in an IP packet in the received frame is an address other than network addresses allocated to the subnet, the determining includes determining that the IP packet is transferred between the internal device and the external device.

17. The roundabout path detecting method according to claim 16, wherein, when it is determined that the IP packet is transferred between the internal device and the external device, the notifying includes notifying the external device indicated by either the source IP address or the destination IP address in the IP packet of the instruction to switch the gateway.

18. The roundabout path detecting method according to claim 16, wherein the notifying includes notifying the external device of the instruction to switch the gateway that is used when the IP packet is sent to the internal device indicated by the destination IP address or the source IP address in the IP packet.

19. The roundabout path detecting method according to claim 15, wherein, when a destination Media Access Control (MAC) address in an address resolution protocol (ARP) response in the received frame is a MAC address of the gateway that is installed in the unit network, the determining includes determining that the ARP response is transferred between the internal device and the external device.

20. The roundabout path detecting method according to claim 15, wherein, when the destination MAC address of the ARP response to be sent is stored in a MAC address storing unit that stores therein the MAC address of the gateway that is installed in the network, the determining includes determining that the ARP response is a transferred between the internal device and the external device.

\* \* \* \* \*